Aug. 10, 1965    D. R. EMMEL ET AL    3,199,164
AUTOMATIC PRODUCTION OF PRESSED
WARE FROM PLASTIC MATERIAL
Filed June 9, 1961    13 Sheets-Sheet 8

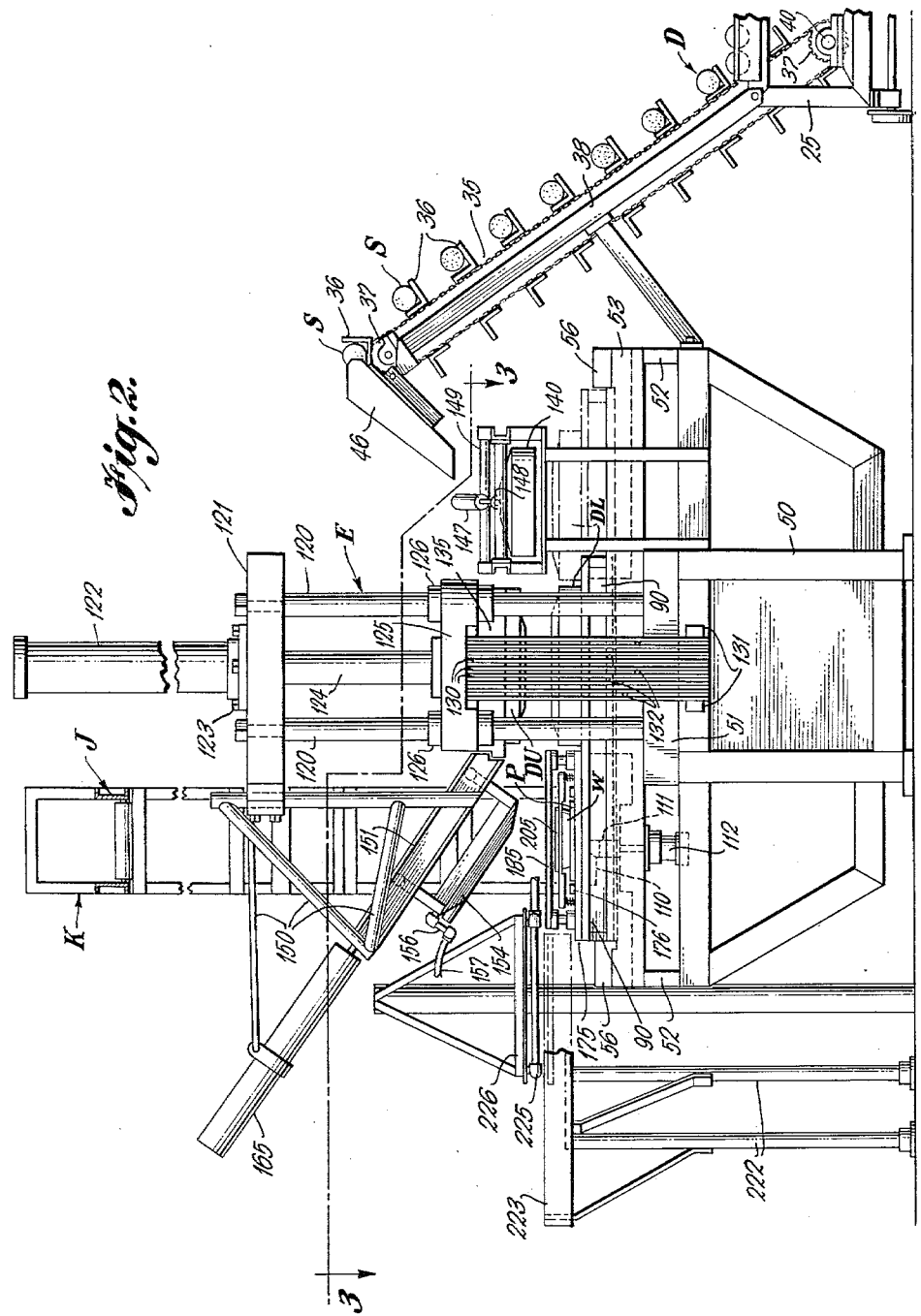

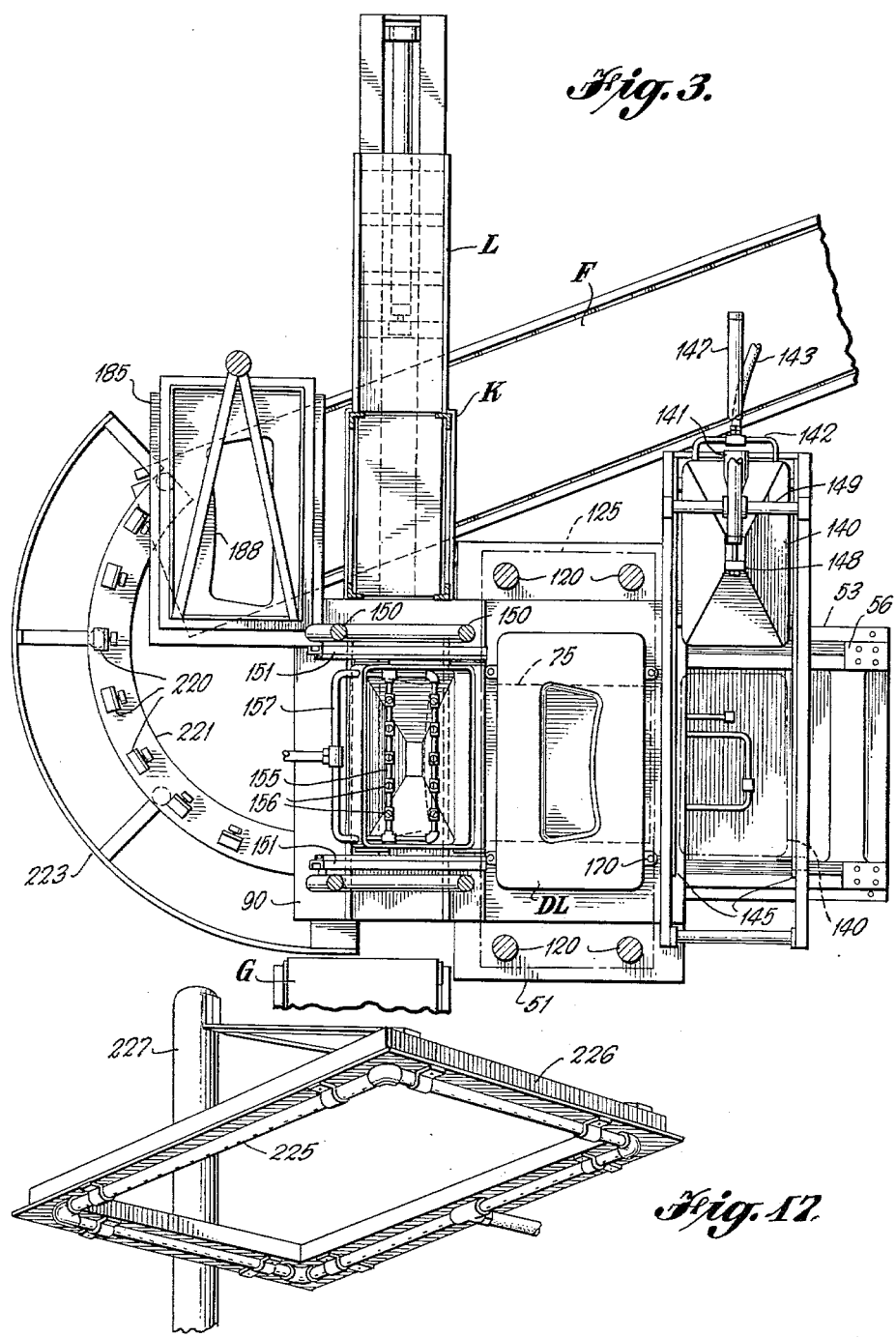

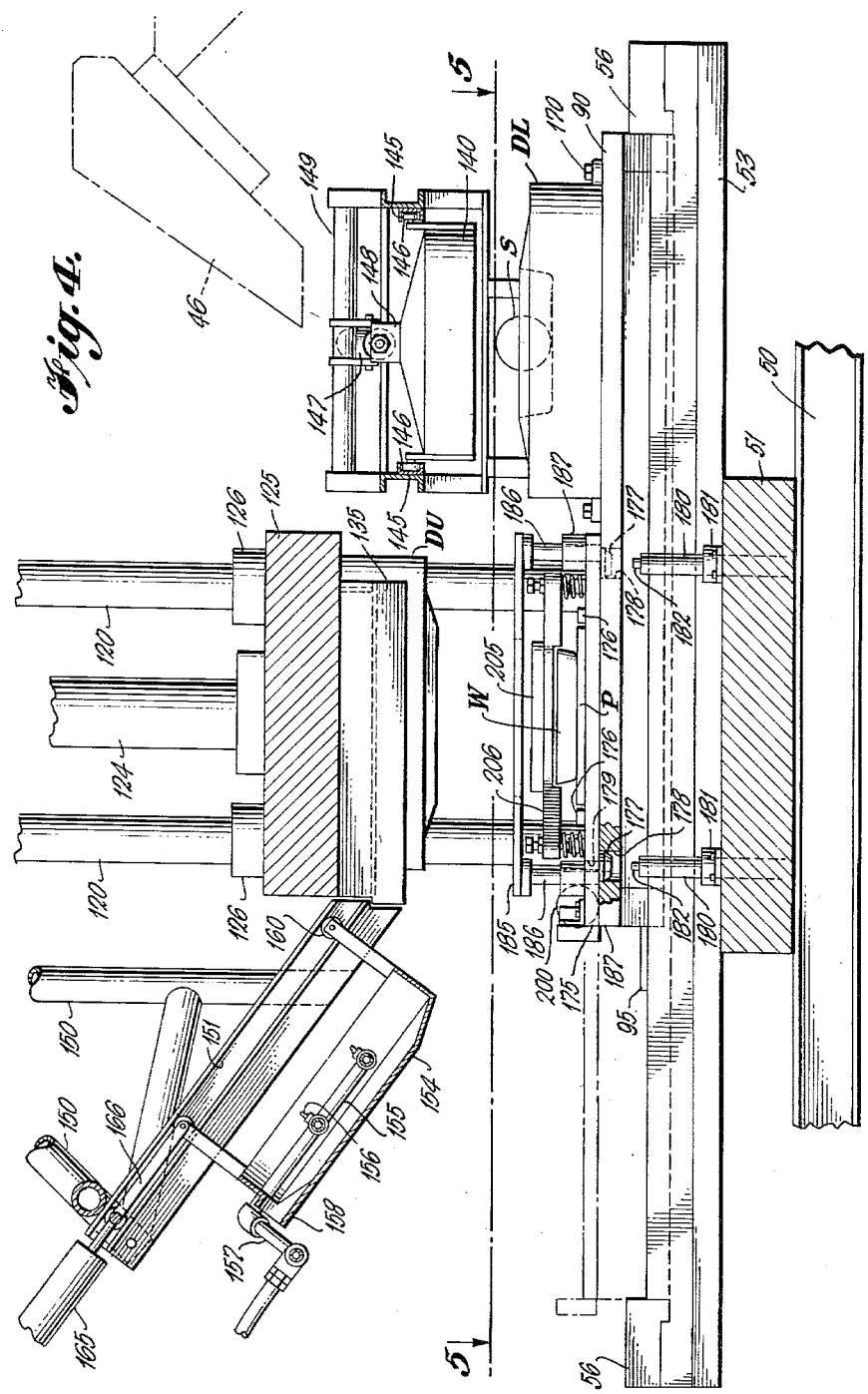

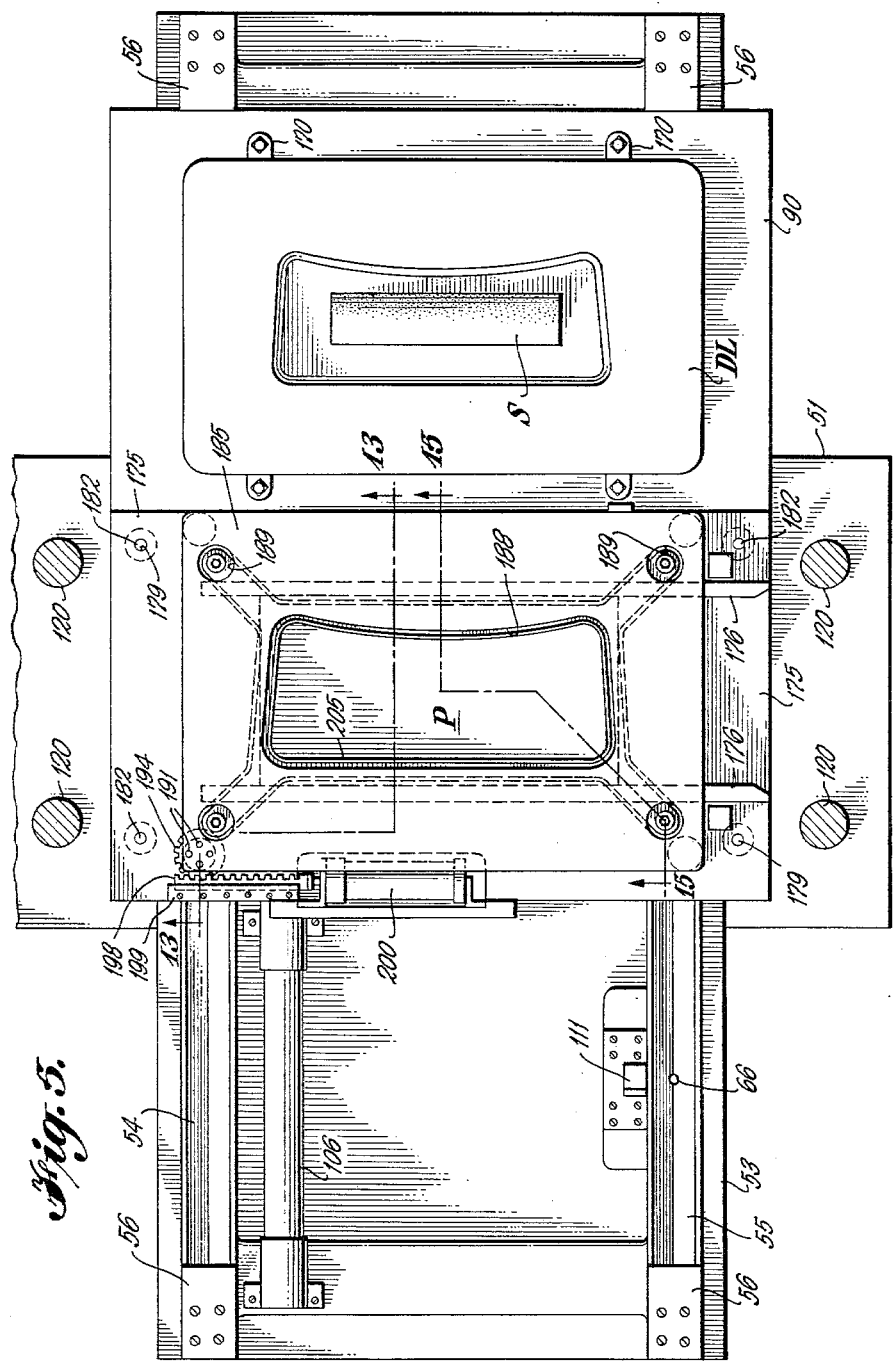

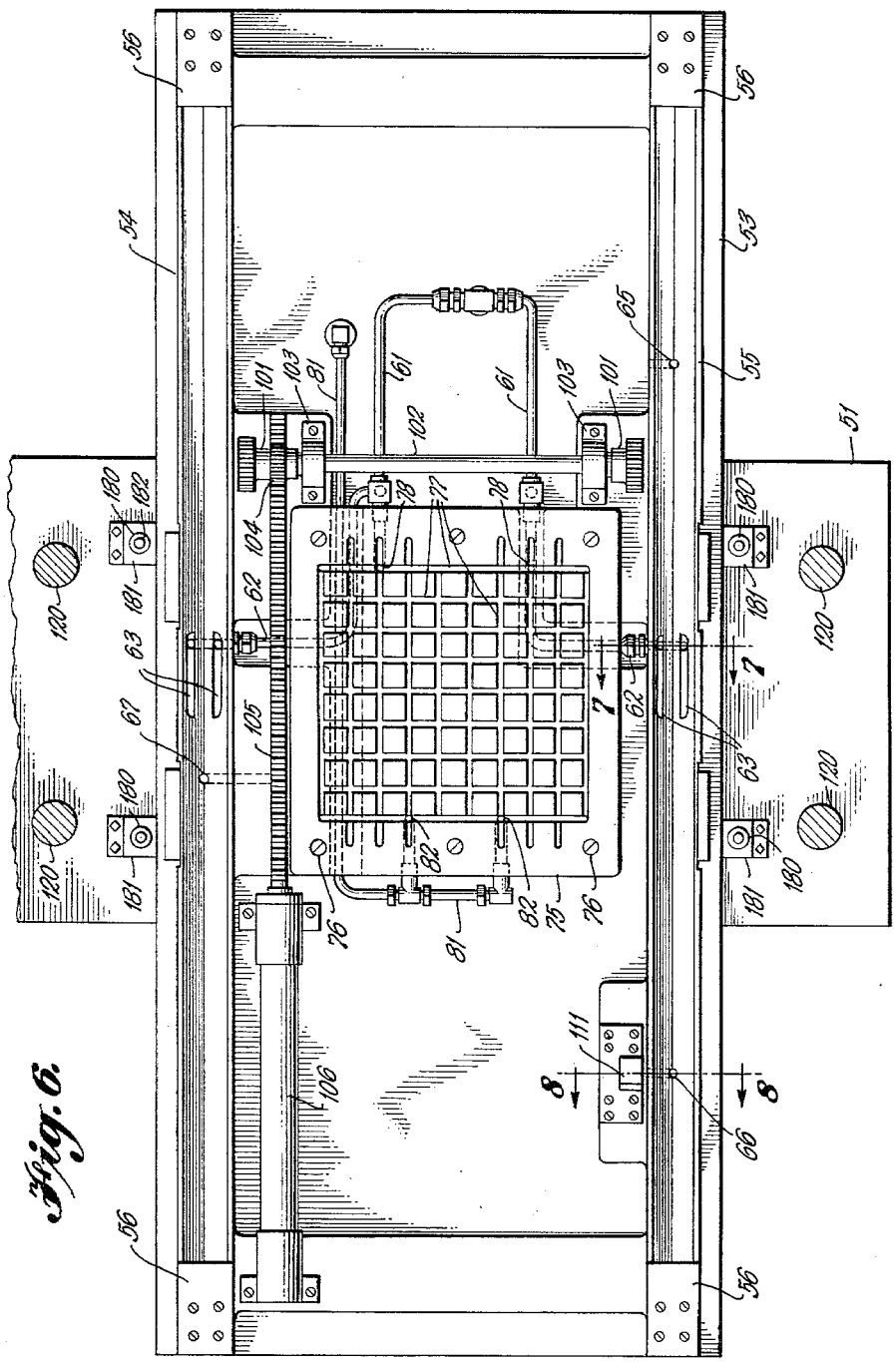

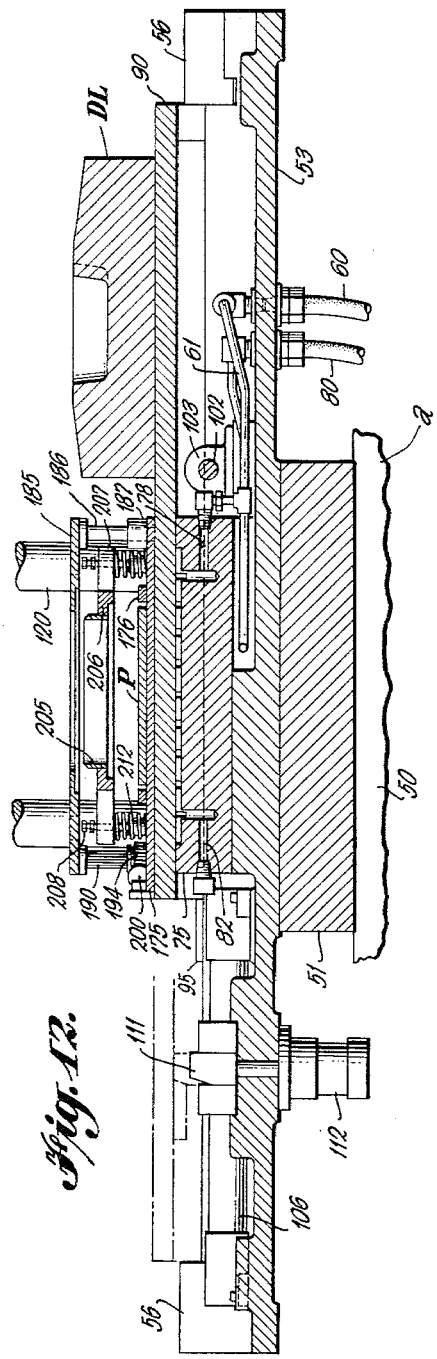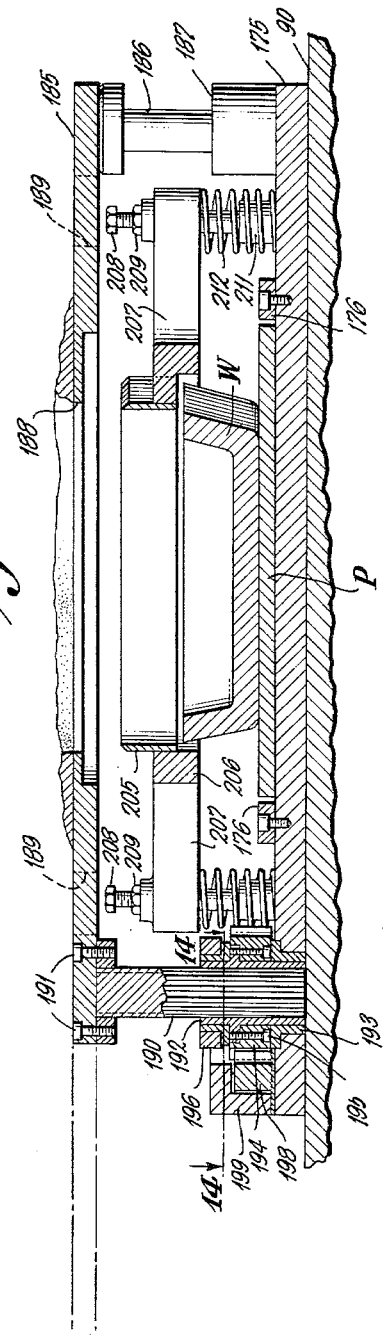

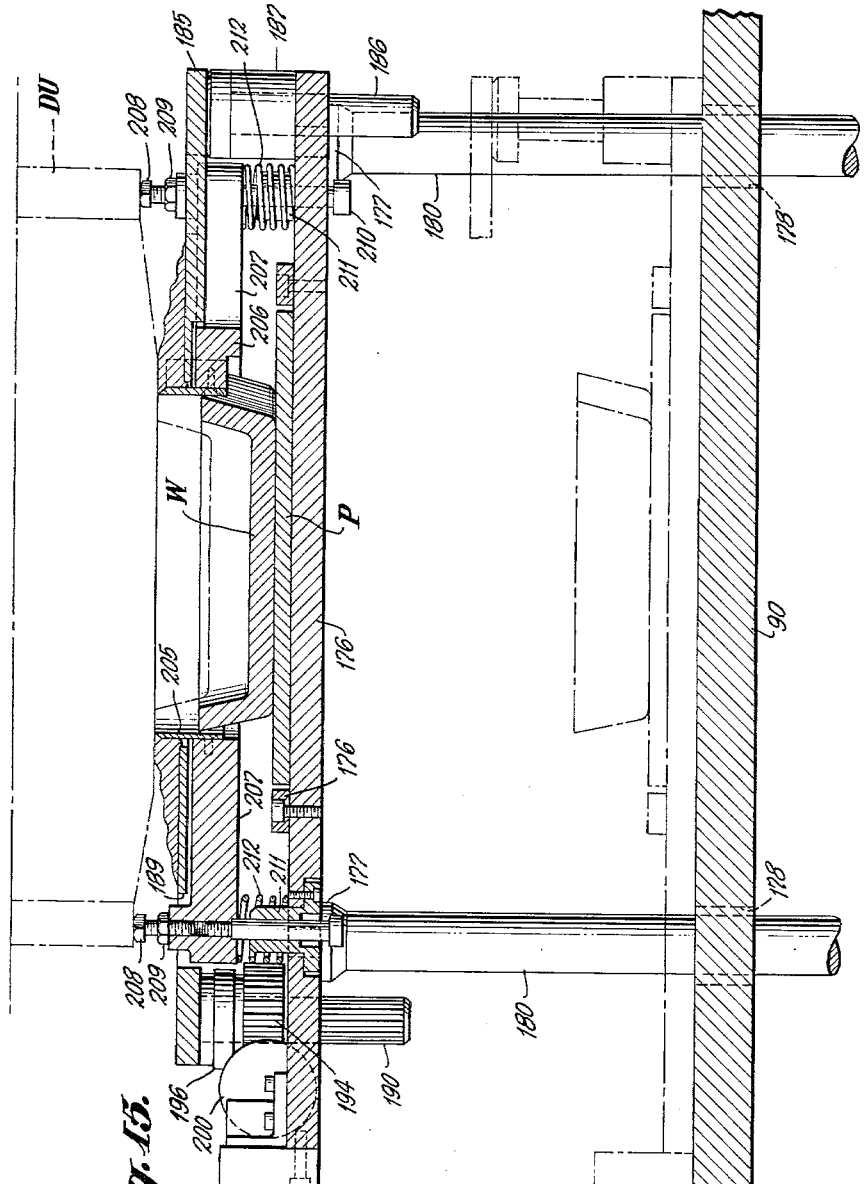

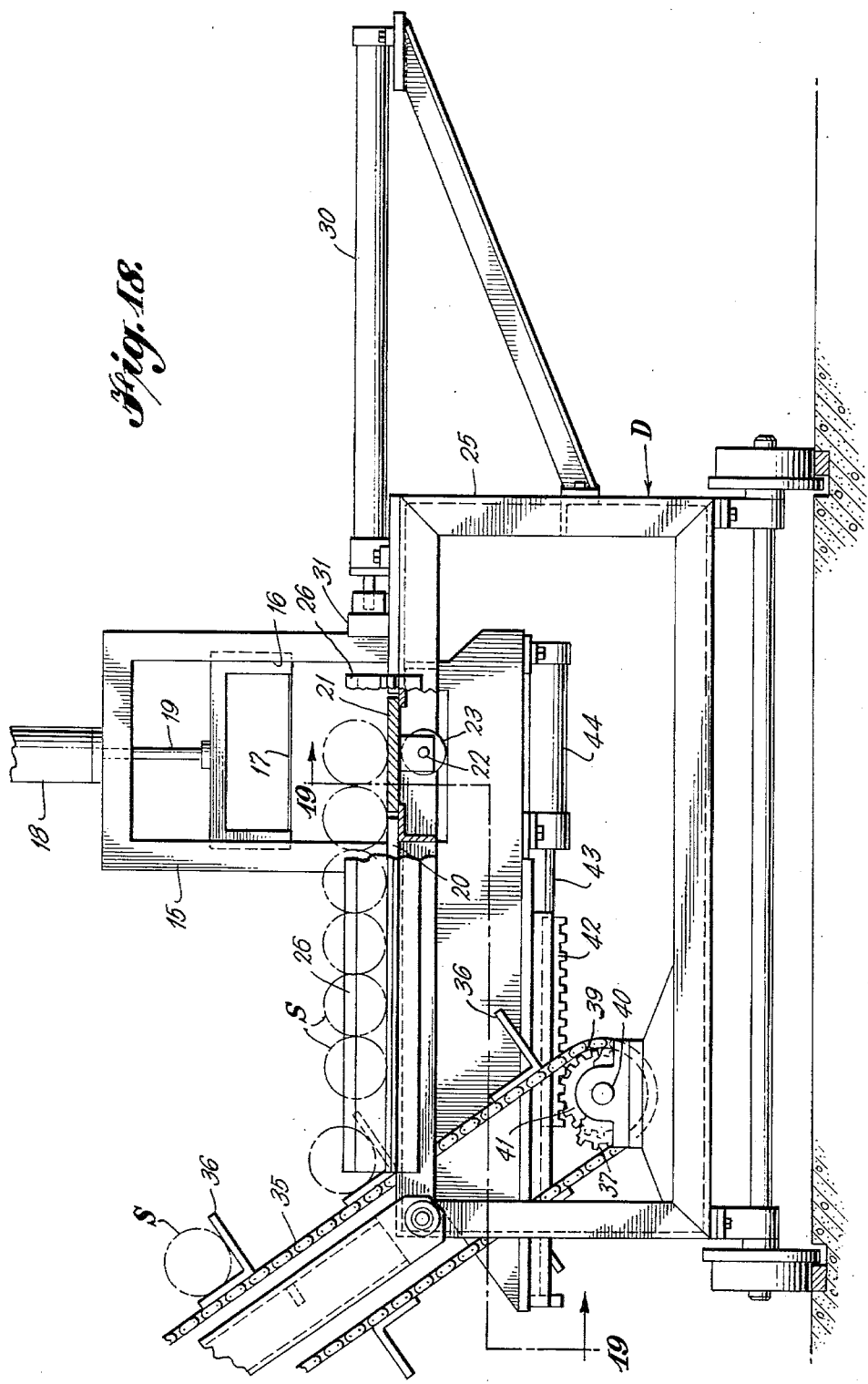

Aug. 10, 1965
D. R. EMMEL ET AL 3,199,164
AUTOMATIC PRODUCTION OF PRESSED
WARE FROM PLASTIC MATERIAL
Filed June 9, 1961
13 Sheets-Sheet 12
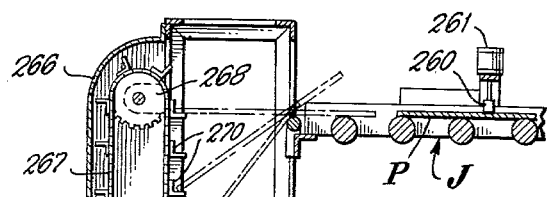
Fig. 20.
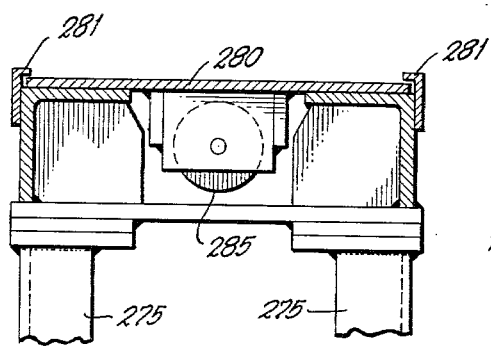
Fig. 21.
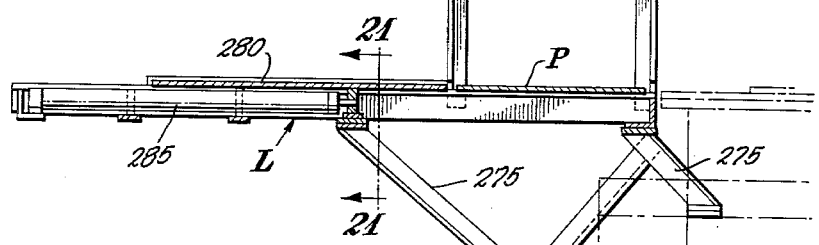
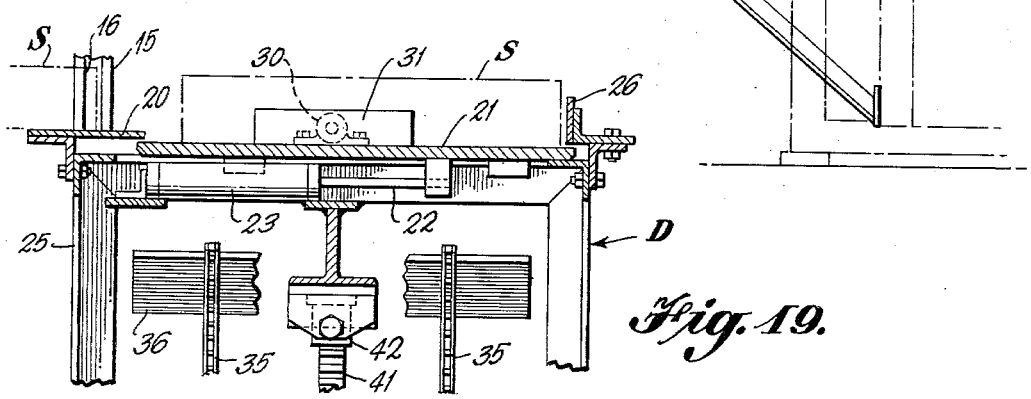
Fig. 19.

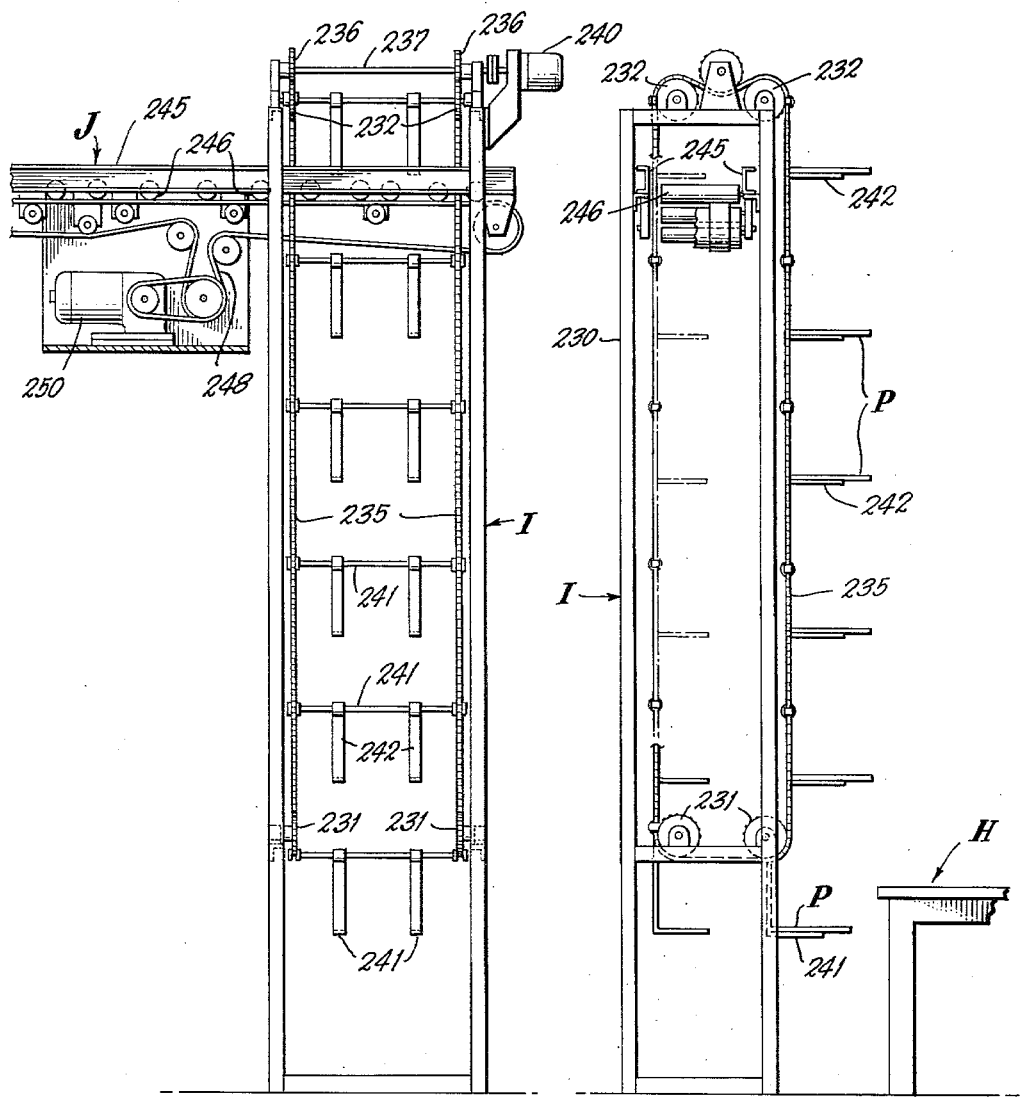

3,199,164
AUTOMATIC PRODUCTION OF PRESSED WARE FROM PLASTIC MATERIAL

Donald R. Emmel, Springfield, Andrew R. Blackburn, Westerville, and Richard E. Steele and Harold H. Dawson, Columbus, Ohio, assignors to The Murray Corporation of America, Pittsburgh, Pa., a corporation of Delaware
Filed June 9, 1961, Ser. No. 116,135
16 Claims. (Cl. 25—2)

The instant invention relates to the production of pressed ware and particularly in forming ceramic ware from moldable plastic materials such as clay. More specifically, the invention is directed to apparatus for effecting automatic production of pressed ware commencing with material such as clay in a moist plastic state and forming it into ware in a self-supporting state ready for drying, glazing and firing to give a final finished product. Although certain features of the invention make it especially suitable in ware pressing with moisture containing materials, when these features are not incorporated the invention is equally well suited for pressing with moldable plastic material in general.

The instant invention embodies automatic ware pressing wherein the material, in a plastic state, is employed with a single pressing operation to form the ware in a self-supporting state with a portion of the moisture such as water existent in the plastic material where a moisture containing material is employed being removed incident to the pressing operation. The instant invention makes particular application of the ware pressing method disclosed in the Blackburn et al. Patent 2,584,109 of February 5, 1952. In use of this method, a pair of porous surfaced dies are employed which together define a ware forming cavity therebetween conforming to the desired configuration of the ware to be produced. A body of plastic material such as clay is pressed between these dies under relatively high pressure such that moisture if present in the material passes into the porous die surfaces. The formed ware is released from the dies by applying fluid pressure such as air under pressure against the ware surface through the porous surfaces of the dies so that upon separation of the dies, the formed ware is readily removed therefrom.

The invention herein provides apparatus which will automatically and continuously perform the full cycle of operations involved in the ware pressing operation and in handling the raw starting material, the flash produced in the pressing operation which is removed as scrap, the moisture which may be introduced into the die from the pressing operation and the final pressed ware. Thus it is a primary object of the invention to provide improved apparatus for effecting automatic production of pressed ware from plastic material such as clay.

It is another object of the present invention to provide for the production of pressed ware in an automatic fashion commencing with plastic material such as clay and wherein the pressed ware in a self-supporting state is produced without manual intervention during the production operation.

Another object of the instant invention is to provide apparatus for the automatic production of pressed ware which incorporates a ware press and wherein the ware, in the course of its production, is automatically handled on reuseable pallets, which pallets are returned to the press after removal of the ware from the pallets.

It is also an object of the instant invention to provide automatic ware producing apparatus with means for forming and feeding a slug of plastic material to a ware press and means for separate removal of the pressed ware and scrap material from the press, said ware being removed on a pallet from which it is subsequently separated and the pallet returned for reuse at the ware press in removing subsequent pressed ware.

A still further object of the instant invention is the provision of apparatus embodying features as defined in the above object and wherein the lower die on the press and the ware receiving pallet are shuttled beneath the press upper die to effect in sequence pressing of the ware and removal of the ware as adhered to the upper die.

An additional object of the invention is to provide apparatus incorporating a ware press as defined in the two immediately preceding objects such that the upper die need only be elevated to clear the lower die which is shuttled from beneath the press upper die to remove the ware from the upper die whereby the need for the time and structure to raise the upper die to the usual higher elevation for ware removal is avoided.

A further object is to provide apparatus in accordance with the above objects which further includes dewatering hoods operably mounted to remove surface moisture from the upper and lower die between successive ware pressing operations.

It is also an object of this invention to provide apparatus in accordance with the above objects wherein flash material formed incidental to the ware pressing operation is removed from the pressed ware between pressing operations in conjunction with disposing the pallet to receive the pressed ware which has had the flash material removed therefrom.

The above and other objects and novel features of the instant invention will be apparent from the following description taken in connection with the accompanying drawings. It is to be expressly understood, however, that the drawings are for the purpose of illustration only and are not intended to define the limits of the invention, but rather to merely illustrate a preferred embodiment and structure incorporating the features of the instant invention adapted to produce a particular pressed ware article.

In the drawings wherein like reference characters refer to like parts throughout the several views:

FIGURE 3 is a horizontal sectional view taken on line 3—3 of FIGURE 2.

FIGURE 4 is a detailed view showing features of the ware press including the press shuttle, scrap and ware removal assembly and die dewatering hoods.

FIGURE 5 is a view taken generally on line 5—5 of FIGURE 4.

FIGURE 6 is a plan view similar to FIGURE 5 with the press shuttle removed.

FIGURE 7 is a detailed sectional view taken on line 7—7 of FIGURE 6.

FIGURE 12 is a longitudinal sectional view showing construction details of the press shuttle and scrap and ware removal assembly.

FIGURE 13 is a sectional view taken on line 13—13 of FIGURE 5.

FIGURE 15 is a sectional view taken on line 15—15 of FIGURE 5.

FIGURE 17 is a perspective view showing the air jet nozzle assembly employed in removing the scrap from the scrap tray.

FIGURE 18 is a side elevational view of the clay slug loader with parts thereof in section.

FIGURE 19 is a sectional view taken on line 19—19 of FIGURE 18.

FIGURE 20 is a sectional view showing the pallet lowering device and pallet feeder.

FIGURE 21 is a sectional view taken on line 21—21 of FIGURE 20.

FIGURE 22 is a front elevational view of the pallet elevator showing a portion of the elevated pallet return conveyor; and FIGURE 23 is a side elevational view of the pallet elevator shown in FIGURE 22.

GENERAL DESCRIPTION OF APPARATUS

Figure 1:
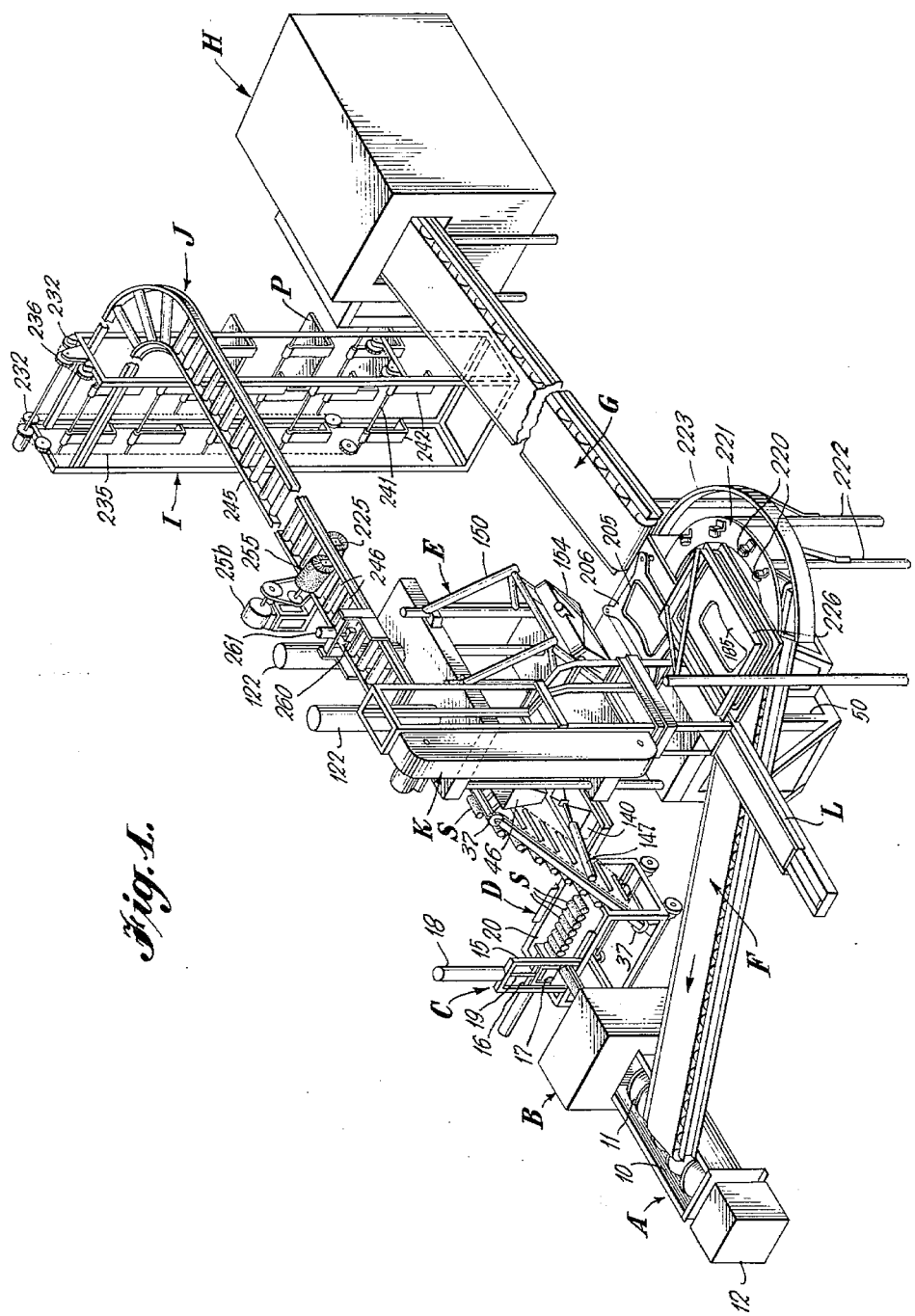
FIGURE 1 is a diagrammatic perspective view illustrating the general relationship to the various parts and components of the ware producing apparatus.

Before turning to a detailed description of the specific structural details embodied in the pressed ware producing apparatus, a general description of the components and features of the apparatus may best be given. In this respect, primary reference will be made to the diagrammatic perspective view of FIGURE 1.

For purposes of illustration and in the specific description of one adaptation of the ware producing apparatus of this invention, the embodiment shown on the drawings will be described in connection with the production of a particular pressed ware article, namely, a toilet tank cover. Such cover is produced by the apparatus in a continuous automatic fashion, essentially without manual intervention, starting with moist clay raw material and continuing through production of the tank cover in a self-supporting condition ready for final drying, finish trimming, glazing and firing. It is to be expressed understood that the particular adaptation of the apparatus to produce a tank cover and the utilization of moist clay as the raw starting material are only specific examples of pressed ware and raw materials which may be produced and employed in making use of the inventive features of the instant invention. Thus, an almost indefinite variety of pressed ware articles may be produced with the apparatus depending primarily on the configuration of the die cavity formed between the mating dies used on the ware press. Also, a variety of different raw materials in a plastic state may be used in the apparatus to form pressed ware articles. Where the raw material contains moisture, such as water, certain features of the apparatus are particularly important in conjunction with the porous surfaced dies used on the ware press.

In the specific adaption of the apparatus, the raw clay material in a formable condition is kneaded in pug mill A and fed to a deairing extruder B from which it is extruded as a solid cylinder of clay. This pug mill may include an open trough with a helical screw rotatable therein to work the clay and feed it into the intake of the deairing extruder B in which air is removed from the clay by being subjected to vacuum and the solid cylinder of clay extruded therefrom.

The continuous solid cylinder of clay is formed into clay slugs of predetermined length by a measuring and cut-off assembly C with measures and severs the cylindrical extrusion into desired lengths, each length providing a clay slug S containing the proper amount of clay necessary to form the particular ware shape to be produced which in the illustrated embodiment is a toilet tank cover. The clay slugs pass from the cut-off assembly C onto the bed of a clay slug loader D. The loader operates to dispose the slugs in parallel arrangement on the bed and feed them one by one in timed sequence with the ware press operation up the inclined loader conveyor and drop them in succession from the upper end of the loader conveyor and through a loading chute to load the lower die on the ware press.

Figure 2:
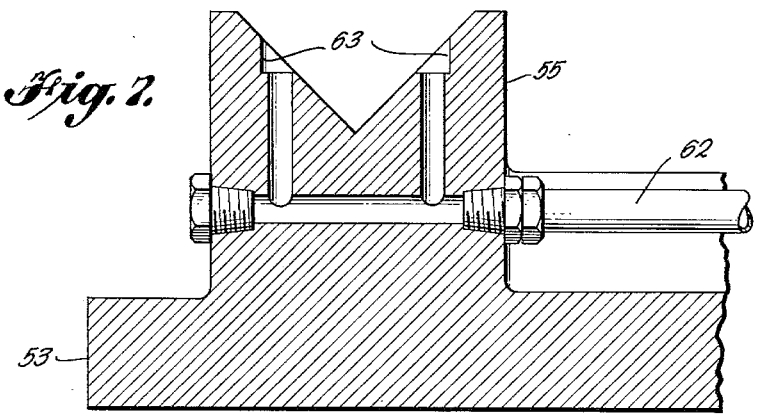
FIGURE 2 is a side elevational view showing the ware press and a portion of the clay slug loader.

The ware press is generally designated at E on FIGURE 1, although a better illustration of the various components or assemblies of the ware press is shown in FIGURE 2. The press E provides a pair of porous dies DL and DU which are employed to press the ware, i.e., a toilet tank cover as illustrated, from the clay slug S. In the press E, the lower die DL is mounted on a reciprocable shuttle so that this lower die may be shuttled between a loading position whereat it is disposed generally beneath the loading chute and a pressing position whereat the lower die DL is aligned beneath the upper die DU carried on the underside of the vertically reciprocable press platen.

The press E also includes a first dewatering hood mounted to be horizontally reciprocable in a path extending transversely above the loading position of the lower die DL so that the hood can overlie the lower die when such die is disposed in loading position and cooperate with such die to remove moisture from the surface of the lower die between ware pressing operations where a moisture containing plastic material is being used in the pressing operations. A second dewatering hood is mounted to permit it to be moved from the position shown in FIGURES 1 and 2 down beneath the upper die DU for removing moisture from the surface of the upper die after the article has been pressed.

A pallet supporting platform which functions to receive and manupulate individual pallets P for the pressed ware W, once the ware is removed from the upper die, is also carried on the press shuttle. The positioning of the pallet supporting platform on the shuttle is such that when the lower die DL is disposed at the loading position, the pallet supporting platform will be located beneath the upper die DU. Likewise, when the shuttle is shifted to carry the lower die DL to a position aligned beneath the upper die DU, the pallet supporting platform and pallet P carried thereby will be disposed in the position as shown in FIGURE 2.

A ware trimming blade is mounted above the pallet supporting platform and a scrap removing tray mounted to be swingable above the pallet supporting platform, the trimming blade and the pallet P. The trimming blade has an opening conforming in outline to the configuration of the tank cover ware W to be produced. The scrap tray is swingable to a position as shown in FIGURE 1 whereat it lies beneath an air jet nozzle manifold (FIGURE 17) by means of which air jets are directed against the scrap on the tray to blow the scrap through the tray opening. Thereupon the scrap falls onto a suitable conveyor F which carries the scrap back to the pug mill A to be reworked and incorporated with clay as it is fed into the deairing extruder B.

The pallet P collects the pressed ware W as it is released from the underside of the upper die DU and facilitates handling of the ware in removing it from the press and passing it to the ware finishing operations. Thus, after the ware W has been released onto an empty pallet P on the pallet supporting platform, the shuttle is shifted to position the ware carrying pallet P as shown in FIGURE 2. The pallet with the formed ware W thereon is pushed from the press by feeding an empty pallet whereupon the ware carrying pallet P is transferred to a conveyor G. Conveyor G carries the pallet with the ware thereon to suitable drying facilities H where at least a substantial portion of the pore moisture is removed. Thereafter, the ware W and pallet P are separated at a suitable unloading table and the empty pallet placed on one of the lifting shelves of a pallet elevator I. The ware, as removed from the pallet, may be subjected to finishing operations such as final trimming of the edges of the ware and thereafter the ware may be glazed and fired in the usual manner to produce the finished article.

The pallet elevator I raises the pallets and deposits them on an elevated conveyor J by means of which they are transferred back for reuse at the press E. The elevation of conveyor J avoids transfer of the pallets at a level which would interfere with other operations performed on machines located between the ware press and the unloading table H. The conveyor J passes the pallets to a pallet lowering device K which is disposed adjacent the ware press E. The pallets, as released from the end of conveyor J are lowered by device K in succession to be engaged by a pallet feeder L at the bottom of device K. In its operation, feeder L engages a pallet and pushes it onto the pallet supporting platform of the ware press E in proper timed sequence with operation of the press. The actuation of pallet feeder L in pushing a pallet onto the pallet supporting platform is also effective to push the ware carrying pallet from the platform onto conveyor G.

GENERAL OPERATION OF WARE PRODUCING APPARATUS

With the pug mill A in operation, the helical screw therein feeds the clay to the deairing extruder B from which the solid cylindrical clay extrusion is cut into lengths by the measuring and cut-off assembly C. The cut-off lengths in the form of clay slugs S move onto the bed of slug loader D and are thereby conveyed upwardly to be discharged from the loader through the loading chute onto the lower die DL on ware press E. Of course, the press shuttle is disposed at this time with die DL in loading position to receive the slug S.

In its loaded condition, the lower die DL has a clay slug S generally centered thereon as the slug is received from the slug loader D through the loading chute. Thereupon, the shuttle is shifted and locked in place to dispose the lower die DL beneath the upper porous die DU carried on the ware press platen. The upper die DU is then lowered to press the slug S into the form of the cavity defined between the upper and lower dies.

The ware pressing operation generally employs the teachings of the ware pressing process described in Blackburn et al. Patent 2,584,109 of February 5, 1952. In this process a pair of porous surfaced dies made of a permeable plaster material are used and in the pressing action, moisture is pressed from the clay and absorbed by the porous faces of the dies. The ware becomes adhered to the faces of both the upper and lower dies as a result of the pressing action carried out in forming the ware. However, the porosity of the dies enables releasing the ware from the die faces by applying fluid pressure such as air under pressure through the faces of the dies.

Following the teachings of the above-mentioned patent, in the instant invention, releasing fluid pressure is applied across the face of the lower die DL immediately prior to separating the die DL and DU. Thus, the formed ware is released from the surface of the lower die DL and as the dies part, the ware remains adhered to the face of the upper die DU.

During the aforementioned operations, the pallet feeder L will have pushed an empty pallet P as received from pallet lowering device K to dispose this empty pallet on the pallet supporting platform. The scrap tray will be positioned as shown in FIGURE 2 so that the opening therein is aligned above the scrap trimming blade. In this relationship, the scrap tray and trimming blade will be positioned directly above the pallet P.

The shuttle is shifted to carry the now empty lower die DL back to its loading position where, prior to receiving another clay slug S from loader D, the die is subjected to a dewatering operation to remove excess moisture from the die surface. In performing this, the die is covered with the aforementioned lower die dewatering hood and the moisture is blown from the surface of the die by air jets specifically positioned within the hood to wipe the die surface. The shifting of the shuttle carries the pallet supporting platform with the empty pallet P thereon under the upper die DU. Once aligned beneath the upper die, the pallet P is raised to dispose it immediately beneath the formed ware which is still adhered to the upper die DU. Raising the pallet supporting platform also elevates the scrap trimming blade, extending it through the opening in the scrap tray so that it engages the clay flash on the underside of the upper die DU that surrounds or encircles the pressed ware whereupon the clay flash and pressed ware may be separated with the clay flash being removed as scrap.

At this time, release fluid pressure such as air under pressure is applied across the face of the upper die DU, thereby releasing the formed ware and flash from the upper die. The desired pressed ware settles through the trimming blade and opening in the scrap tray onto the pallet P while the flash settles from the upper die as scrap onto the scrap tray which encircles the trimming blade.

With the pressed ware resting on the pallet P, the pallet is lowered which also effects withdrawal of the trimming blade from the scrap tray opening. In this relation of the parts, after the upper die has been dewatered as described below, the shuttle is again shifted to move the pallet supporting platform and related parts out from under the upper die DU and move the lower die DL which has been dewatered and reloaded with a clay slug, in under the upper die.

Before the next pressing operation is carried out, the dewatering hood for the upper die is passed on its tracks under the upper die DU to remove excess moisture from the die surface. Thereby, the upper die is dewatered by blowing air across the surface thereof to remove purged surface moisture. It may be noted that the dewatering of the dies is important where moisture containing material such as clay is used in that the pressing action will usually express water from the clay as it is formed into the ware, such water being absorbed by the die surfaces. The application of the releasing fluid pressure tends to return this water to the die face blowing water and clay fines onto the surface of the ware and surface of the die. If this excess moisture is not removed between pressing operations, defective ware may be produced with imperfections occurring in the ware surface resulting from water or air blisters, improper release action may result when fluid pressure is applied across the die surface for release, etc.

With the pallet supporting platform disposed out from under the upper die DU, the scrap tray carrying the clay scrap is swung to the position shown in FIGURE 1 where it underlies an air jet nozzle ring. Air jets are then impinged beneath the edges of the ring of scrap, blowing it through the opening in the scrap tray whereupon it falls onto scrap return conveyor F. This conveyor returns the still soft clay scrap to the pug mill A where it is incorporated with new clay which is extruded and formed into the clay slugs.

The pallet P with the pressed ware thereon is pushed from the pallet support platform onto the conveyor G. The conveyor then passes the ware to suitable drying facilities H. Thereafter, the ware and pallet are separated at the unloading table with the ware subsequently being subjected to a final finish edge trimming and the usual glazing and firing operations to produce the finished tank cover product.

The pallet P, separated from the pressed ware, is placed on pallet elevator I which carries it up and deposits it on elevated conveyor J whereby the pallet is transferred back to the ware press E through the intermediary of the pallet lowering device K and pallet feeder L. It will be appreciated that the feeding of the pallets from conveyor J into lowering device K for their reuse is controlled in timed operation with functioning of the ware press E.

PUG MILL A

The pug mill A is of a generally conventional construction as heretofore employed in kneading clay to render it of a uniform plastic consistency suitable for use in ware pressing. The pug mill as illustrated in FIGURE 1 embodies an open trough 10 which has a helical screw 11 rotatably mounted therein. A suitable power-drive means 12 is connected to drive the screw 11 and thereby effect kneading or working of the clay and feed it to the deairing extruder B. As pointed out in the general description hereinabove, the open trough of pug mill A permits return of soft clay which is removed as scrap incidental to pressed ware production by the ware press E. Thus, the scrap is conveyed by conveyor F and discharged into the open trough 10 to be reworked with the new clay as it is fed to the deairing extruder B.

DEAIRING EXTRUDER B

The clay passing from the pug mill A enters the deairing extruder B which is also of conventional construction. Since the details of construction of the deairing extruder form no part of the instant invention, they are not specifically illustrated or described herein. The general functioning of the extruder is such that the clay is shredded and exposed to vacuum so that at least a substantial portion of the air entrained within the clay is withdrawn and the extruded clay material will be essentially of a solid air-free consistency.

The extruder B extrudes a continuous solid cylinder of the clay in a moist plastic condition to the measuring and cut-off assembly C.

MEASURING AND CUT-OFF ASSEMBLY C

The continuous solid cylindrical clay extrusion passes through the measuring and cut-off assembly C where it is engaged by a measuring wheel (not shown) which controls operation of the cut-off to sever discrete lengths which may be referred to as clay slugs S. Each of these slugs, as determined by the length thereof and cross-sectional area of the continuous extrusion, contains the requisite quantity or amount of moist plastic clay needed to produce the particular pressed ware article in the instant illustrated embodiment, a toilet tank cover.

The cut-off which is controlled by the extruded length measured by the measuring wheel (not shown) that rolls against the clay extrusion as it is extruded includes a frame 15 providing upstanding parallel guideways 16 between which the clay extrusion passes. A cut-off wire 17 is reciprocably mounted on a holder slidable in guideways 16. An extensible fluid motor 18 has the cylinder thereof mounted at the upper end of frame 15 with its piston rod 19 connected to the holder carrying cut-off wire 17.

The actuation of the cut-off wire 17 to sever a predetermined length from the clay extrusion, as operated by motor 18, is timed under control of the measuring wheel so that the extrusion will be severed into predetermined lengths in accordance with the required quantity or amount of clay necessary for each slug S to form a single tank cover. It must be appreciated that it is impractical to provide in the slug only enough clay material to form the cover. To do so would create the danger of voids occurring at the corners or other points in the pressed ware while the clay which is supposed to fill these voids is extruded as flash beyond an edge of the cavity defined between the dies. In the ware pressing operation having excess material extruded outwardly as flash is also important to insure proper back pressure or forming pressure within the material being formed into the ware in the die cavity. Reference may be had to Steele et al. Patent 2,627,641 of February 10, 1953 for a more detailed discussion of these considerations. Accordingly, sufficient excess clay is included in the slug to insure that in pressing the ware, the ware will be fully and properly formed with the excess clay forming a ring of flash extruded between the dies and extending outwardly from the ware forming cavity defined between the die.

CLAY SLUG LOADER D

The clay slugs S as they are severed by the cut-off wire of assembly C from the continuous extrusion formed by extruder B pass onto the bed 20 of the clay slug loader D. The construction of the loader is best seen in FIGURES 2, 18 and 19. Referring to FIGURES 18 and 19, it will be seen that the bed 20 is provided with a slug shifting plate 21 mounted to be slideable transversely of the bed in the direction of the extrusion of the clay between guideways 16 of the measuring and cut-off assembly C. Plate 21 is connected to the piston rod 22 of an extensible fluid motor 23, the cylinder of which is mounted on the frame 25 of the loader D.

With the plate 21 retracted to the left from its position shown in FIGURE 19, the extrusion passes onto the loader bed 20 and plate 21 thereof and the proper length severed by cut-off wire 17 to form the slug S. The motor 23 is then operated to shift the plate 21 and carry the slug S resting thereon into engagement with the upstanding abutment 26. This separates the slug from the remainder of the extrusion which is being continuously produced by extruder B.

Once separated as shown in FIGURE 19, the slug is moved forwardly on the bed 20 of the loader D by means of an extensible fluid motor 30 which has the cylinder thereof mounted on frame 25 and a pusher block 31 secured on the outer end of its piston rod. The motor 30 operates to shove the slug forwardly on bed 20 whereby a series of slugs S may be lined up as shown in FIGURES 1 and 18 in readiness to be picked up by the lifters at the forward end of bed 20 which successively move the slugs to charge the ware press E in accordance with its operating cycle. The motor 30 is preferably an air motor employing relatively low actuating pressure such that the slugs will be pushed forwardly in succession from plate 21 onto the stationary portion of bed 20 without undue pressure which might jam the slugs together resulting in distorting the shape of the clay slugs. Of course, the rate of extrusion from extruder B and the feed thereto from pug mill A will preferably be controlled so that the exact proper length to form a single slug will be produced timed in relation to the use of one slug in forming a pressed ware article at the ware press E.

As the clay slugs are formed and pushed forwardly on bed 20, the pusher block 31 is retracted after each slug pushing operation to be ready to push the next slug as it is formed and severed from the clay extrusion. A convenient control to insure a constantly available supply of clay slugs while avoiding excessive slug production may be provided by a suitable limit switch mounted to be responsive to the existence of a predetermined maximum number of slugs on bed 20 which switch is effective to shut down operation of the extruder B and assembly C until the number of slugs on the bed has been reduced below such maximum by feeding a slug to the ware press E.

The loader D has, at its forward end, a pair of endless roller chains 35 extending upwardly at an inclined angle with the chains carrying lifters 36. The chains pass around sprockets 37 (FIGURES 1 and 2) mounted on arms 38 at the upper end of their paths and engage with sprockets 39 mounted on frame 25 at the lower end of their paths. The sprockets 39 are keyed to a shaft 40 which in turn carries a pinion 41. A rack 42 is mounted to engage with pinion 41 and is connected to the piston rod 43 of an extensible fluid motor 44. A suitable one-way clutch (not shown) is employed to interconnect the pinion 41 with shaft 40 such that upon extension of rack 42 and rod 43, drive pinion 41 will turn sprocket 39 and advance the lifters 36 for a predetermined distance toward the upper sprockets 37 while upon retraction of the rack the lifters will remain stationary.

As lifters 36 move upwardly, each engages and carries along one of the slugs S that has been pushed forwardly on bed 20 by operation of motor 30. The operations of motor 44 are timed in accordance with the ware pressing cycle of the ware press such that for each operation of motor 44 the lifters 36 will be advanced a distance to discharge one slug S from the upper end of the slug loader to charge the lower die DL of the ware press. The arms 38 carry a slug loading chute 46 through which each slug passes from the uppermost lifter 36. The chute 46 is mounted so that the end thereof generally overlies the lower die DL of the ware press E when such die is disposed in loading position. Thus, the slug S passing through chute 46, will drop onto the upwardly facing lower die DL in properly centered relation to the die to be formed into the tank cover by subsequent operations of the ware press.

WARE PRESS E

In giving a detailed description of the features of the ware press, several sub-combinations, components and assemblies may best be identified and described under separate sub-headings. However, the interaction and cooperation of these various components, assemblies and sub-combinations is such that they co-act to produce an improved and most efficient automatic operation in the production of pressed ware from the clay slugs S which are formed and loaded onto the press in accordance with the procedure and apparatus described hereinabove.

(a) *Mounting and actuation of ware press shuttle*

The general overall construction of the ware press may best be understood by reference to FIGURES 2 and 3. As mentioned in the general description above, the press is provided with a shuttle carrying the lower die DL to enable it to be readily loaded and thereafter aligned beneath the vertically movable upper die DU. Considering first, the mounting of the shuttle and parts carried thereby on the press, the details are shown more specifically in FIGURES 4, 5, 6, 7, 8, 9, 10, 11 and 12.

The press is formed with a welded framework base 50 which supports a bed block 51 and support members 52 at the outer ends thereof. A cast metal shuttle base 53 is mounted to extend across and be supported on bed block 51 and support members 52, all as clearly shown in FIGURE 2. A plan view of the shuttle base with the shuttle removed is shown in FIGURE 6 and a cross-section through the shuttle base 53 is shown in FIGURE 12.

The shuttle base 53 is provided on its upper face with a pair of parallel tracks 54 and 55. Each of these tracks is provided with a V-shaped groove extending along the length thereof such that the tracks have a cross-sectional configuration as shown in section in FIGURES 7 and 8. Bumper blocks 56 are bolted at the opposite ends of each of the tracks 54 and 55 to be engaged by snubbers mounted on the shuttle as will be described in connection with specific reference to the structural details of the shuttle.

Figures 8, 14:
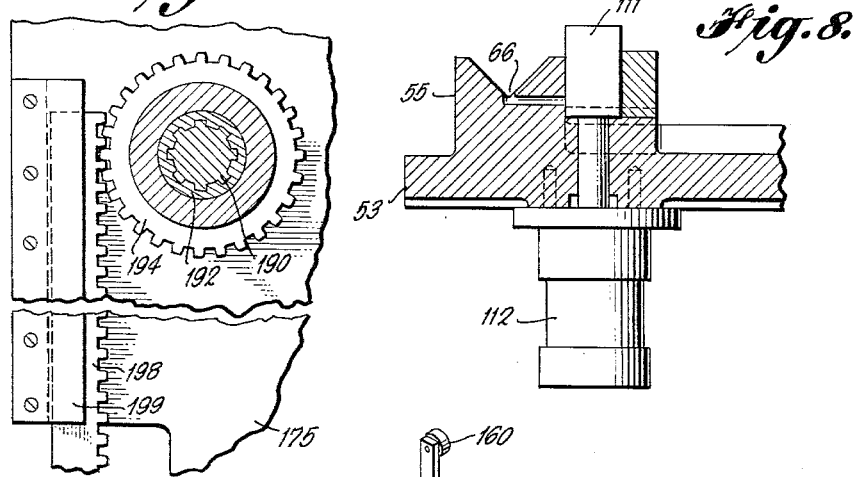
FIGURE 8 is a detailed sectional view taken on line 8—8 of FIGURE 6.
FIGURE 14 is a sectional view taken on line 14—14 of FIGURE 13.

As will be better understood from the description of the shuttle hereinafter, the tracks 54 and 55 serve to support and guide the shuttle during its shifting movements in operation of the ware press. To lubricate and facilitate shifting of the shuttle relative to the shuttle base 53, each of the tracks 54 and 55 is supplied with oil under relatively low pressure. The oil is conducted upwardly through the bottom of shuttle base 53 from a suitable hose 60. The oil flows therefrom through pipes 61 and a portion of the oil is directed through pipes 62 into the bottom of the respective V-shaped grooves in tracks 54 and 55. As shown in FIGURE 6, and in section in FIGURE 7, elongated recesses 63 are provided in the inclined walls of each of the V-shaped grooves to distribute the oil along the tracks. In contemplation that oil will be continuously supplied to provide a load supporting oil film along the V-shaped grooves of the tracks, a drain hole 65 is provided in the bottom of track 55 along with a drain hole 66 which latter hole supplies oil to a shuttle locking dog as shown in FIGURE 8 and later described in detail. In track 54, a drain hole 67 is provided leading to a slot which slidably receives the rack employed to effect shifting of the shuttle.

Referring again to FIGURES 6 and 12, the shuttle base 53 has a cast metal bolster 75 secured by screws 76 to the top of the central portion of the shuttle base. This bolster is important in offering a rigid, essentially non-yieldable base for supporting the ware pressing load when the lower die DL and upper die DU are operated to press the ware. The bolster overlies the central portion of the shuttle base 53 which in turn is solidly supported on bed block 51 carried by welded framework base 50. The bolster 75, while providing solid support for the pressing loads, still permits the shuttle to be readily shifted as needed in the ware pressing operation.

The upper face of the bolster 75 has a network of slots 77 milled therein which are in communication with the oil pipes 61 through bores 78 formed in the bolster. Additionally, an oil supply hose 80 (FIGURE 12) connects with pipe 81 which supplies additional oil to the milled slots 77 through bores 82 in the bolster.

Figure 9:
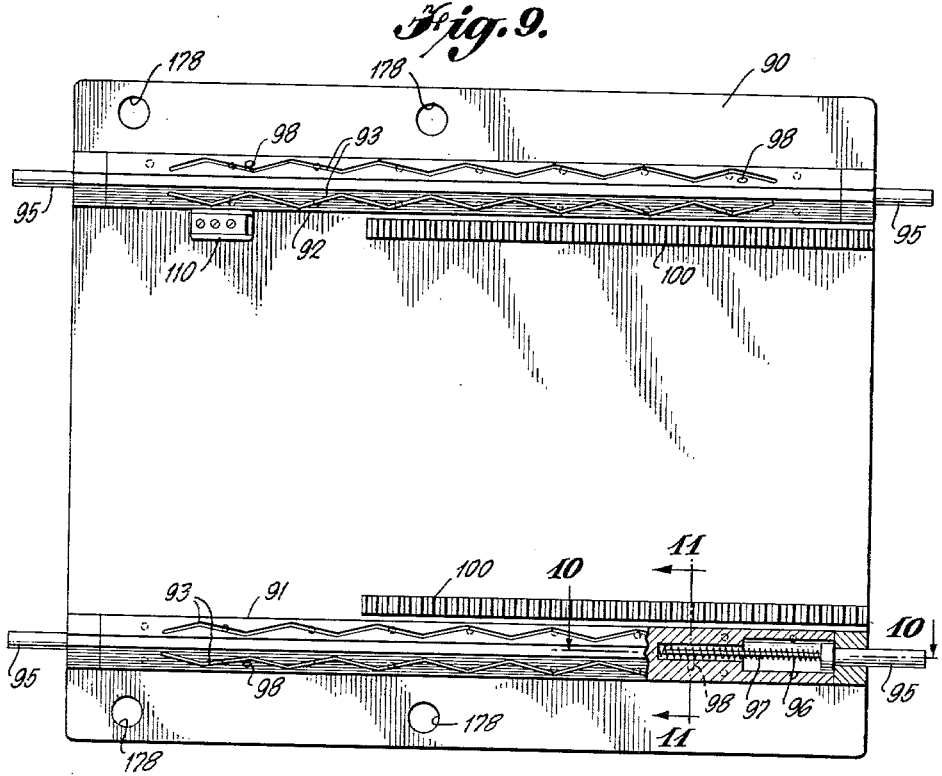
FIGURE 9 is a view with parts in section showing the under side of the press shuttle.
Figure 10:
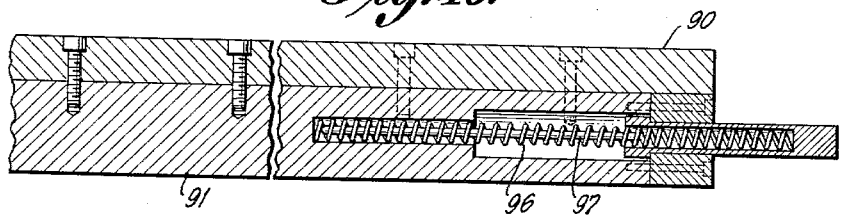
FIGURE 10 is a sectional view taken on line 10—10 of FIGURE 9.
Figure 11:
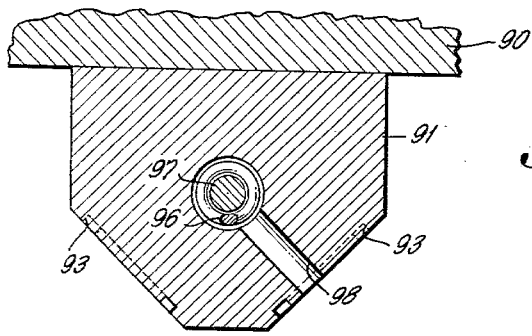
FIGURE 11 is a sectional view taken on line 11—11 of FIGURE 9.

The construction details of the shuttle 90 are illustrated in FIGURES 9, 10, and 11, while FIGURES 5 and 12 indicate the relationship that the shuttle has to the shuttle base 53 when mounted thereon. As will be better understood from the subsequent description, the shuttle mounts the lower die DL and the assemblies for trimming and separately removing the pressed ware and scrap from the press.

FIGURE 9 shows the underside of the shuttle 90 which is made up of a shuttle plate which has rails 91 and 92 mounted in spaced parallel relation to the underside of the shuttle plate. These rails 91 and 92 are spaced to mate with the V-shaped grooves in the tracks 54 and 55 on shuttle base 53 and thus each rail has a cross-sectional configuration as shown in FIGURE 11.

As referred to above, an oil film is distributed along the tracks 54 and 55 to lubricate and facilitate shifting of the shuttle 90 relative to the shuttle base 53. To promote distribution of this oil between the mating surfaces of tracks 54 and 55 and rails 91 and 92, respectively, each of the rails 91 and 92 has the inclined surfaces thereof formed with zig-zag oil grooves 93. Thus, the oil fed into the V-shaped grooves in tracks 54 and 55 through recesses 63 is distributed by grooves 93 to effectively provide an oil film between the rails and tracks such that the shuttle 90 may be shifted without undue resistance.

Each of the rails 91 and 92 is provided with a snubber 95 at each of its opposite ends. The construction of the snubber is shown in FIGURES 9 and 10. A spring 96 encircling a throttling pin 97 is disposed to bias the snubber outwardly. An oil hole 98 extends from the surface of the rails 91 and 92 to admit oil to the interior of the cavity which houses the snubber.

The snubbers 95 are positioned to engage with the snubber blocks 56 on the shuttle base 53 as mentioned above. Thus, when the shuttle 90 is shifted to one extreme position on base 53, the pair of snubbers 95 at one end of the shuttle plate engage with blocks 56 on the shuttle base 53. The snubber springs 96 act to retard the shifting movement of the shuttle once the snubbers engage to overcome the inertia of the shuttle and parts carried thereby. Further, the flanged inner end of the snubber serves to restrict flow of oil past the snubber as it moves into its cavity to additionally check the movement of the shuttle such that the shuttle will be slowed and brought to a stop at its extreme position without undue jarring of the press structure.

Referring further of FIGURE 9, the underside of shuttle 90 has parallel racks 100 secured thereto. These racks are secured in spaced relation to engage with pinions 101 (FIGURE 6) which are fastened to shaft 102 journaled in bearings 103 on the shuttle base 53. A third pinion 104 is also fixed to shaft 102 and positioned to be engaged and driven by a rack 105. This rack slides in the groove which is lubricated by oil flow from hole 67 in track 54 as mentioned above. Rack 105 is in turn connected to be operated by the piston rod of an extensible fluid motor 106, the cylinder of such motor being secured to shuttle base 53.

The shuttle 90 also has a stop 110 secured to the underside of the shuttle plate adjacent the inner edge of rail 92.

A shuttle locking dog 111 (FIGURES 6 and 8) is mounted on shuttle base 53 to be raised and lowered by operation of an extensible fluid motor 112. The cylinder of such motor is secured to the underside of base 53 with the piston rod thereof connected at its upper end to the dog 111. The operation of dog 111 is employed to insure accurate and rigid locking of the shuttle during the ware pressing operation at which time the insuring of stationary and accurate positioning of the upper and lower dies is of utmost importance. In addition to locking dog 111 which locks the shuttle against horizontal shifting, means may well be provided cooperating between the shuttle and shuttle base to prevent raising of the shuttle off the base when the dies are vertically aligned. Such a hold down means can be important where proper release of the ware from the lower die does not occur and the suction between the ware and dies might lift the shuttle off the base as the upper die raises.

Turning to the actuation of the shuttle 90, and functioning of the parts in the light of the above description, the shuttle 90 is supported by means of the rails 91 and 92 thereon engaging with tracks 54 and 55 respectively on the shuttle base 53. The oil supplied through pipes 61 and 62 and recesses 63 is distributed by oil grooves 93 to slidably support the shuttle on a film of oil so that it may be readily shifted. Additionally, oil supplied to slots 77 on the bolster tends to lift and give a floating support of the shuttle where it overlies the bolster. With the shuttle mounted on base 53 in the position shown in FIGURES 5 and 12, the pinions 101 engage with racks 100 on the underside of shuttle 90. As the piston rod of motor 106 is extended rack 105 thereon drives pinion 104 which in turn, through shaft 102 rotates the pinions 101 and thereby shifts the shuttle from the position in FIGURES 5 and 12 to the opposite ends of the shuttle base 53. It will be appreciated that other suitable shuttle shifting means may be employed instead of the rack and pinion drive specifically illustrated. For example, extensible fluid motor means may be directly connected between the base and shuttle to effect shuttle shifting.

The upper surface of bolster surface 75 and the underside of shuttle 90 between the racks 100 are machines to closely mate. As heretofore noted, oil is supplied to the network of slots 77 on the face of bolster 75. This oil forms a film which minimizes resistance to sliding of shuttle 90 across the bolster 75. At the same time, the close cooperation of the shuttle with the bolster 75 provides a solid base for the pressing operation. This construction is of particular importance in successful operation of the ware press considering the danger of cracking or otherwise deforming the porous plaster dies should other than a solid base be provided to carry out the pressing operation.

Once the shuttle 90 is shifted to the opposite end of base 53 from that shown in FIGURES 5 and 12, the locking dog 111 is raised by motor 112 with the dog engaging stop 110 to firmly lock the shuttle with the end of the shuttle as shown in FIGURE 2 and in phantom in FIGURE 12 engaged with the bumper blocks 56. In accordance with the above description, as the shuttle approaches the bumper blocks 56, snubbers 95 engage the blocks and act to check the rapid movement of the shuttle to avoid undue jarring of the press as the shuttle reaches its fully shifted position.

(b) *Mounting and actuation of upper die DU*

The bed block 51 on base 50 also mounts upstanding cylindrical columns 120, a pair of such columns being provided on each side of the shuttle base 53 as shown in FIGURE 5. A platform 121 is mounted on the upper ends of these columns 120 which platform mounts a pair of extensible hydraulic motors 122. Thus, as shown in FIGURE 2, the cylinders of motors 122 are bolted at 123 to the platform 121. The piston rods 124 of the motors extend downwardly through platform 121 and are connected to operate the press platen 125, which carries the upper die DU on the underside of the platen.

Platen 125 has guide sleeves 126 adjacent the corners thereof which slidably engage with the cylindrical columns 120 to guide vertical movements of the platen. It will be appreciated that motors 122 through their piston rods 124 are effective to operate the press platen 125 and thus perform the ware pressing operation when the shuttle 90, carrying the loaded lower die DL, is aligned beneath the upper die as shown in FIGURE 2.

The platen 125 has a series of parallel rods secured to one end thereof, as shown in FIGURE 2. These rods extend downwardly and slidably engage between guides 131 mounted on base 50. A group of appropriately located trippers 132 are mounted between adjacent rods at selected positions to effect timing of various operations to be carried out incidental to raising and lowering of the press platen 125.

Although not specifically shown, it will be understood that appropriate valves or switches to control the desired press operations may be mounted on base 50, each to be engaged by a particular tripper 132 as the platen 125 is raised and lowered. The point at which the particular operation controlled by a specific tripper 132 is initiated or terminated may be readily adjusted by merely adjusting the position of the specific tripper longitudinally of the parallel rods 130.

(c) *Mounting and actuation of die dewatering hoods*

As a consequence of the pressing of ware starting from a moist clay slug or other moist plastic material, the porous dies in most cases will absorb moisture from the clay. Although a limited amount of moisture in the dies is desirable to obtain good release action of the pressed ware from the dies and to obtain the best possible surface on the pressed ware, an excess amount of water is to be avoided. When the dies acquire too much water, release of the pressed ware may be difficult under certain conditions and also the ware is subject to being covered by a layer of water, which water then must be removed by subsequent drying, thereby prolonging the operation of producing the final article. Therefore, when excess moisture accumulates it must be purged or removed from the dies at intervals.

The amount of moisture which can accumulate in a die without adversely affecting its performance will vary to some extent with every die and the operations performed in use of the die. However, in any specific case there are limits to the proper moisture content within which the die will function satisfactorily. The fluid pressure applied across the face of the die to effect release of the pressed ware will return a portion of the moisture within the porous die to its surface. This excess moisture may then be removed after the ware is separated from the die and in some instances this will suffice to keep the die properly moisture conditioned for most effective ware production. The rapidity with which the die surface is treated after ware release to remove this excess moisture will also affect the amount of moisture that can be removed since when the release fluid pressure is terminated the moisture on the die surface will immediately commence to be absorbed back into the die surface by capillary action.

If for a specific die and pressing operation the moisture expelled incident the ware release and thereupon removed from the die still permits an excess build-up of moisture in the die, purging pressure may be maintained across the face of the die after the ware has been separated therefrom. This purging pressure will expell more moisture from the die which may be removed to maintain the moisture condition of the die within the proper limits for the specific die and pressing operation being carried out.

Where a plastic material containing moisture such as water is being used the apparatus of the instant invention provides die dewatering hoods which are employed to maintain the moisture condition of the dies within the proper limits for most effective ware production. The mounting and construction of the die dewatering hoods is illustrated in FIGURES 2, 3, and 4.

The lower die DL faces upwardly. In the loading position, the upwardly facing surface of the die is exposed. To remove the excess surface moisture, the dewatering hood 140 for the lower die is mounted to be shifted horizontally from a position where the lower die is exposed to receive a clay slug from the slug loader D to a position where it overlies the loading position of the lower die DL. The hood 140 has a pan-like configuration which is open at its underside and has an outlet 141 through which air and moisture exit. The hood has a nozzle manifold (not shown) mounted therein which is connected by a pipe 142 to an air hose 143. The air nozzles on the manifold are specifically arranged to jet air downwardly against particular locations on the face of the lower die DL, whereby moisture is driven from the face and entrained in the air which exits through outlet 141. The particular arrangement of the nozzles for directing the air jets will vary with each die surface configuration and must be disposed to take into consideration the specific contour of the die surface from which the excess moisture is to be removed.

Parallel tracks 145 are mounted to extend above the loading position of the lower die DL. The hood has rollers 146 which will engage with tracks 145 so that the hood is suspended from the tracks and movable generally horizontally from a dewatering position whereat it overlies the lower die DL to a retracted position, as shown in FIGURE 3. Thus the tracks 145 are constructed such that as the hood is shifted to its dewatering position closely overlying the lower die DL the air jets may be most effective in removing the surface water. A suitable extensible fluid motor 147 is connected to the hood at 148 with the cylinder thereof mounted above tracks 145 on a support 149 to effect shifting of the hood at the proper time to effect dewatering.

To dewater the upper die DU, a dewatering hood 154 similar to hood 140 is mounted on platform 121 by a framework 150 which carries inclined tracks 151. These tracks terminate adjacent the upper position of platen 125 and are constructed to mate with parallel tracks 135 carried on the underside of platen 125 at the opposite ends of upper die DU.

Figure 16:
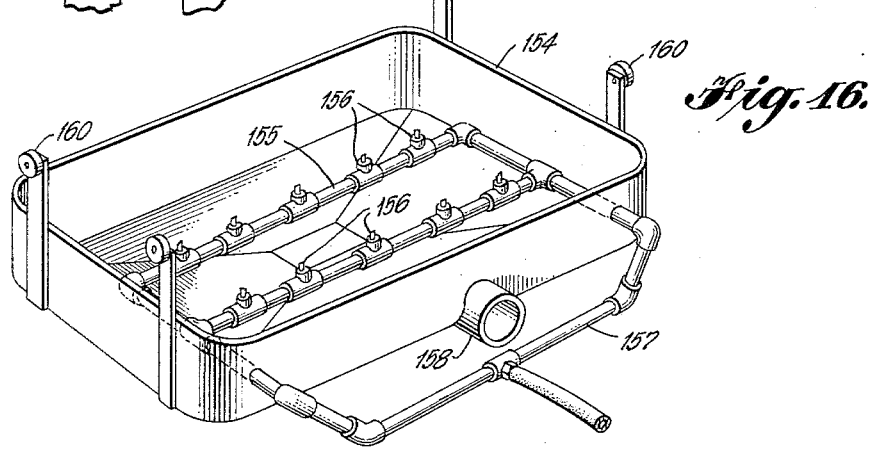
FIGURE 16 is a perspective view of the upper die dewatering hood.

The hood 154 and hood 140 are generally similar, both having an open pan-like configuration, as shown more clearly for hood 154 in FIGURE 16. A nozzle manifold 155 is mounted within the hood having nozzles 156 to form fan-like air jets directed outwardly through the open face of the hood. Air is supplied to the nozzle ring through pipe 157 from a flexible hose connected thereto. The hood 154 has an air and moisture outlet 158 similar to the outlet 141 of hood 140.

The configuration of the nozzle manifolds in the hoods 140 and 154 and the positioning of the nozzles thereon, such as nozzles 156 on manifold 155, are particularly important in their relationship to the press dies to remove excess moisture from the die surfaces. By reference to the nozzle positioning shown with respect to hood 154 it may be pointed out that nozzle 155 will expel fan-like jets of air which will impinge against the die with which the hood cooperates. These fan-like jets are so disposed relative to the configuration of the particular article being pressed, i.e., a tank cover, that the jets will effectively sweep the die surface to remove moisture from corners and crevices of the die as well as planar surfaces. The directing of the air jets is important with respect to each different set of dies employed with the press. Thus, the configuration of the manifold which determines the arrangement of the nozzles, the particular positioning of nozzles on the manifold in relation to jets from adjacent nozzles and in relation to the die contours are all factors which must be considered in constructing nozzle manifolds for the hoods to be used with a particular set of dies, since the die contours to be accommodated in removing die surface moisture have an important bearing on how the air jets should strike the die surface to remove this moisture.

Rollers 160 are mounted on the ends of the hood 154 disposed to engage with tracks 151 and tracks 135 as best shown in FIGURE 4. An extensible fluid motor 165 is supported on the framework 150 with the piston rod connected through a suitable linkage 166 to extend and retract the dewatering hood 154.

With the press platen 125 in its raised position as shown in FIGURES 2 and 4, the motor 165 is operated to extend the hood 154 with rollers 160 moving down inclined tracks 151 and into the horizontal tracks 135 carried on the underside of platen 125. This positions the hood beneath the upper die DU where the air jets from nozzle manifold 155 impinge upon the downwardly facing surface of the die to blow off excess moisture which exits through outlet 158. Thereafter, the motor 165 is again operated to retract the upper dewatering hood 154 to the position as shown in FIGURES 1, 2 and 4.

(d) *Mounting and actuation of scrap trimming and separate pressed ware and scrap removal assemblies on shuttle*

The lower die DL is bolted at 170 adjacent one end of shuttle 90 so that when the shuttle is shifted to the position shown in FIGURE 2 and locked by engagement of dog 111 with stop 110, the upper and lower dies will be vertically aligned to carry out pressing of the ware from a clay slug S previously loaded onto the lower die. The other end of the shuttle 90 carries assemblies for receiving and removing the pressed ware when it is released from the under surface of the upper die DU, for trimming the clay flash from the pressed ware and for removing the flash as scrap separate from the pressed ware. The structure for handling the pressed ware and scrap is best shown in FIGURES 2, 4, 5, 12, 13, 14 and 15.

A pallet supporting platform 175 rests on the upper surface of shuttle 90. This platform has spaced parallel side rails 176 secured on the upper face thereof between which is positioned the pallet P to receive the ware and be employed in handling its removal from the press. The underside of platform 175 is provided with four sockets 177 which are received in the bores 178 formed in the shuttle 90 (FIGURE 9). These sockets 177 each have a bore 179 which is engaged in the raising and lowering of the platform as described below. In its normal position, platform 175 rests on shuttle 90 with the sockets 177 engaged in bores 178 as shown in FIGURE 4.

When the ware is to be released from upper die DU and the scrap trimmed and removed therefrom, in the illustrated embodiment the pallet P is raised to dispose it immediately beneath the upper die so that upon being released, the pressed ware will have only a small distance to settle from the upper die onto the pallet P. To raise the pallet P, the platform 175 is lifted by four lifting pins 180 which are mounted in bushings 181 to extend downwardly through the bed block 51 and be elevated and retracted at the proper times to engage with bores 179 in the sockets 177 and raise and lower the platform 175. The lifting pins 180 have reduced diameter ends 182 which mate with bores 179 in sockets 177 to insure proper operation in the raising and lowering of the pallet supporting platform. The operation of raising and lowering lifting pins 180 may be effected by suitable motor means (not shown) mounted in the base 50 below bed block 51. The pins 180, as shown more clearly in FIGURE 6, are disposed outwardly of the shuttle base 53 such that in their retracted condition they do not interfere with shifting of the shuttle 90 as effected by motor 106.

A scrap removal tray 185 is mounted on the platform 175 by three mushroom headed pins 186 which slidably engage with sleeve bushings 187 affixed to the upper surface of platform 175. These pins are disposed at three of the four corners of tray 185 as shown in FIGURE 5.

Tray 185 has a central opening 188 (FIGURE 5) conforming generally to but slightly larger than the peripheral contour of the pressed ware W. Also apertures 189 are provided in tray 185 to accommodate upper limit studs on the scrap trimming assembly.

As shown in FIGURE 13, the fourth corner of the scrap tray 185 is supported by a spline shaft 190 mounted on the underside of tray 185 by a flange on the shaft engaged by cap screws 191. The spline shaft 190 slideably engages with an internally splined sleeve 192 which in turn is rotatably mounted in a bushing 193 secured to the pallet supporting platform 175. The sleeve 192 has a pinion 194 secured thereto by cap screws 195. A ring 196 encircles the upper end of sleeve 192 and is flush therewith to form a stop for the flange on spline shaft 190 when the platform 175 is raised and, during such upward movement, picks up the scrap tray 185.

Each of the mushroom headed pins 186 and the spline shaft 190 extend through the platform 175 and rest on the upper surface of the shuttle 90. These pins and the spline shaft are thus slideable relative to platform 175 such that as the platform is raised by the action of lifting pins 180, the tray 185 initially remains stationary until the head of pins 186 and bushings 187 and the flange on shaft 190 and ring 196 move together. Thereafter, the tray 185 moves up with platform 175 with the parts in the position shown in FIGURE 15.

A rack 198 is mounted to engage with pinion 194 with movement of the rack being guided by an angle member 199 secured to platform 175. The rack is connected to the piston rod of an extensible fluid motor 200 with the cylinder of such motor secured to the platform 175. The operation of motor 200 by driving rack 198 is thus effective through pinion 194, sleeve 192 and splined shaft 190 to swing the scrap tray 185 as is done in pivoting the tray for removal of the scrap therefrom. It will be appreciated that the splined shaft and internally splined sleeve may be replaced with other means to effect pivoting movements of the tray, one such alternative being the use of a square shaft slideably received within a square bore sleeve with roller bearings mounted within the sleeve bore to promote sliding movement of the square shaft within the bore.

The pallet supporting platform 175 also carries a scrap trimming blade 205 which is mounted in a holder 206. Holder 206 has an inner opening with the blade 205 secured to the perimeter of this opening. Although shown with a somewhat sharpened upper edge to effect a distinct severing of the flash clay from the pressed ware, blade 205 under some conditions may have a blunt edge whereby the flash is pressed against the upper die and the flash in effect torn from the pressed ware when the ware is released.

The formation of the holder opening and blade affixed thereto is such that the blade embraces an area corresponding to the periphery of the particular pressed ware to be produced. In the illustrated embodiment, the suggested pressed ware being a toilet tank cover, the blade 205 has a configuration corresponding to the desired external configuration of the tank cover as shown in FIGURE 5. The opening 188 in the scrap tray 185 is such that the blade 205 can pass therethrough without striking the tray and engage with the flash clay on the underside of the upper die DU to trim away the flash from the pressed ware in the manner as shown in FIGURE 15.

The holder 206 has outwardly extending support arms 207. Each of these arms has an internally threaded bore with a stud 208 provided with a lock nut 209 threaded into the upper end thereof. These studs in the scrap trimming operation pass upwardly through the openings 189 in the scrap tray 185 and engage with the underside of the frame of the upper die DU as shown in FIGURE 15 to limit upward movement of blade and thereby avoid undue pressure of the blade 205 against the underside of the die. By appropriate adjustment of the lock nuts 209, the proper degree of engagement of the blade 205 with the flash clay on the undersurface of the upper die DU can thus be achieved.

The lower ends of the threaded bores in arms 207 are provided with headed studs 210 which extend downwardly and slidably engage in sockets 211 fastened on the platform 175. A spring 212 is disposed between the platform 175 and the underside of each arm 207 to normally urge the blade 205 and holder 206 upwardly such that the heads of studs 210 are seated in the sockets 211. In this state, the blade and holder assume a position relative to platform 175 as shown in FIGURES 4, 12 and 13.

In the light of the above-described structure, the functioning of the assemblies for removing the pressed ware from the upper die for trimming the flash scrap clay from the ware and for removing the scrap separate from the ware may be described.

Assuming the shuttle 90 positioned as shown in FIGURE 12 and the platform 175 having an empty pallet P positioned thereon between rails 176, the platform will be resting on the shuttle 90 and the scrap tray 185 and trimming blade 205 disposed as shown in FIGURE 12. Thereupon the lifting pins 180 are elevated from bed block 51 to engage with sockets 177 on the platform 175 thereby raising the platform. During initial raising movement of the platform, the scrap tray 185 will remain stationary since it is supported on pins 186 and splined shaft 190 which are slidable relative to platform 175 and rest on the upper surface of shuttle 90.

The blade 205 on holder 206 is carried upwardly with platform 175 by reason of springs 212 biasing it to its elevated position above the platform. By this action, the scrap tray 185 is lowered relative to platform 175 to a point such that the blade 205 extends through opening 188 in the tray. When the studs 208 on blade holder 206 engage the underside of the upper die frame, further upward movement of the blade 205 is prevented. However, before this occurs, the blade will have moved upwardly to sever the flash clay around the perimeter of the pressed ware or with a blunt-edged blade press the flash up against the upper die to hold it while the pressed ware is released. Further upward movement of platform 175, as pins 180 continue to rise, will result in compressing the springs 212 while the pallet P is raised closer to the pressed ware to receive it from the under face of the upper die DU. Release pressure is then applied internally of the upper die to release the pressed ware W as well as the flash from the die surface on which it has been retained. The ware W thereupon drops onto the empty pallet P with the flash falling as scrap onto the scrap tray 185 which surrounds the trimming blade 205 in the relation as shown in FIGURE 15. With a blunt-edged blade 205 the weight of the pressed ware may be relied upon to tear the flash from the ware since the flash is held against the upper die by the blade during release of the ware.

The lifting pins 180 are then retracted to lower the platform 175 back down to rest on shuttle 90. During this lowering movement, the blade 205 in holder 206 and the scrap tray 185 are returned to their positions relative to platform 175 as shown in FIGURE 13 with the scrap resting on the tray 185. At this point, the shuttle may be shifted by operation of motor 106 and thereafter the scrap removed from tray 185 and ware carrying pallet P removed and replaced by an empty pallet P. It will be appreciated that instead of raising the pallet, scrap trimming blade, etc., the upper die may be lowered to effect the trimming and/or for release of the ware onto the pallet.

With the scrap disposed on tray 185, and the platform 175 lowered so that the parts are returned as shown in FIGURE 13 with the pallet P having the ware W resting thereon, the shuttle 90 is shifted by operation of motor 106 to the position as shown in FIGURE 2. In this position, the scrap tray 185 and pallet supporting platform 175 are removed from beneath the upper die DU.

Motor 200 is then operated such that rack 193 pivots the scrap tray 185 through pinion 194 and splined shaft 190 connected to the scrap tray. In this pivoting movement, the tray 185 slides across the mushroom headed pins 186 and across a series of arcuately spaced rollers 220. These rollers are supported on an arcuate rail 221 which in turn is mounted on suitable support legs 222 (FIGURE 1). A guard rail 223 may also be provided supported on the legs 222 and disposed to enclose the outermost swinging path of movement of the scrap tray 185.

The scrap tray 185 is swung through an arc of 180° to a point where it lies beneath an air jet nozzle manifold 225. This manifold is mounted on the underside of a rectangular frame 226 which is supported from a suitable stanchion 227. In this position of the scrap tray 185 with the air jet nozzle manifold 225 disposed thereabove and with the opening 188 of the scrap tray overlying the scrap return conveyor F, air is supplied to the air jet nozzles on manifold 225 from a suitable air pressure line. The jets of air from nozzle manifold 225 impinge on the upper surface of the scrap tray 185 immediately outwardly of the edges of the ring of scrap to pass inwardly beneath the edges of the scrap ring and lift it on a layer of air. The inward movement of the air jets blows the ring of scrap clay material toward the center of the tray where the air passes down through opening 188 and the scrap falls through the opening 188 and onto conveyor F. Thereafter, motor 200 is again operated to return tray 185 across rollers 220 and back onto the mushroom headed pins 186 to reposition the tray for the next operation of removing scrap.

Also, while the shuttle is positioned as shown in FIGURE 2, the pallet feeder L, described in more detail hereinafter, operates to push an empty pallet P between the side rails 176 and onto the pallet supporting platform 175. This operation pushes loaded ware carrying pallet P off of platform 175 and onto conveyor G which carries the pallet with the ware thereon to the drying facility H.

The structural details of the scrap return conveyor F and conveyor G need not be specifically described since they form no part of the instant invention, although the conveyors do co-operate in the over-all apparatus to render the ware production continuous and automatic. A variety of appropriate conveyor constructions may be employed as desired with conventional conveyor structures being shown as are employed in the apparatus of FIGURE 1.

After being subjected to a drying period in facility H, either by exposure for a relatively short period of time to heated dry air or by exposure for a longer perior of time to atmospheric air, during which at least substantial portion of the pore water is removed from the pressed ware, the ware W is removed from the pallet P. This operation may be performed at an unloading table after which the ware separated from the pallet is subjected to a final finish trimming and thereafter glazed and fired in the normal conventional manner.

PALLET ELEVATOR I AND ELEVATED CONVEYOR J

The pallets P, as they are separated from the ware W are placed on the pallet elevator I. The details of construction of the elevator are best shown in FIGURES 1, 22 and 23. The pallet elevator includes a framework 230 on which are mounted two pairs of sprockets 231 disposed at the lower end of the framework and two pairs of sprockets 232 rotatably mounted at the upper end of the framework. A pair of roller chains 235 are threaded around the lower sprockets 231 and upper sprockets 232 to provide parallel chain runs extending up the face of the framework 230. A pair of drive sprockets 236 mounted on a shaft 237 at the top of framework 230 are engaged with chains 235 with shaft 237 being coupled to be driven by a suitable motor 240.

At spaced points, the chains 235 are bridged by rods 241 which rods each carry two spaced L-shaped lifting shelves 242. These shelves are swingably connected to rods 241 such that they hang freely downwardly and are thus always disposed to support a pallet P when placed on the shelves in the manner as shown in FIGURE 23. As the motor 240 drives the chains, the lifting shelves 242 are raised to carry the pallets upwardly.

At the top of the pallet elevator, an elevated roller conveyor J passes through the framework 230 of elevator I. Conveyor J may take any desired form with a fairly conventional roller conveyor wherein a series of rollers are mounted in spaced parallel relation along the length of the conveyor being specifically illustrated on the drawings. As shown the conveyor J embodies a pair of side channels 245 between which are mounted the pallet supporting rollers 246. A suitable driving belt mechanism 248, driven by a motor 250, may be coupled to positively drive at least a portion of the rollers 246.

Particular mention may be made of the fact that in the portion of the conveyor J which extends into the framework 230 of elevator I, the rollers 246 are supported only at one end from one channel 245. This provides for the rods 241 and shelves 242 supported thereon to pass downwardly in the path of movement of chains 235. Thus, as the shelves 242 carry pallets across the top of framework 230 and start downward, the shelves 242 pass between rollers 246 such that the pallet carried by each pair of shelves is deposited on the rollers and is thereafter conveyed away on the rollers 246 of the conveyor J.

Referring to FIGURE 1, it will be seen that along the length of the conveyor, upper and lower rotary pallet cleaning brushes 255, driven by motor 256 may be provided. The upper brush 255 may be mounted at an angle less than 90° to the path of the conveyor which will thus promote cleaning of the pallets as they pass between the brushes to remove any clay deposits, etc. and prepare the pallets for reuse.

The pallet lowerer K is mounted at the end of conveyor J to receive the pallets in succession from the conveyor and lower them to the pallet feeder L. A brake 260 which may take the form of a vertically reciprocable friction material pad is suitably operated by a solenoid 261 mounted above the discharge end of conveyor J so as to retain the pallets on the conveyor until needed in connection with operation of the ware press E. Operation of this brake is timed to release one pallet at a time from the conveyor to pass into the pallet lowerer K.

PALLET LOWERING DEVICE K AND PALLET FEEDER L

The pallet lowering device K is shown in section on FIGURE 20, to be provided with a frame 265 through which the pallets P are successively lowered. A housing 266 is disposed at one side of the frame 265 enclosing roller chains 267 threaded over upper sprockets 268 and lower sprockets 269. The chains 267 carry brackets 270 which extend parallel to each other similar to the relation of rods 241 to chains 235. The chains are driven so that the brackets 270 on the chain flights closest to the frame 265 move downwardly. Thus, as a pallet is released from conveyor J by operation of brake 260 into the pallet lowering device K, the pallet P initially engages the bracket 270 opposite the conveyor J and is lowered in a controlled fashion in accordance with the downward speed of the brackets 270. The pallets will thus partake of the successive positions as shown in phantom in FIGURE 20 during their lowering.

At the bottom of lowering device K, the frame 265 is enlarged such that the pallet P may assume a horizontal position and at the same time be disengaged from the bracket 270 which controlled its lowering. The pallet then falls to the bottom of the device K in readiness to be pushed onto the pallet supporting platform 175 by pallet feeder L.

The pallet feeder L is mounted at the bottom of device K with the feeder and pallet lowering device being supported on the press frame base 50 by members 275.

The pallet feeder includes a slide 280 of a thickness subtsantially corresponding to the thickness of the pallet P. This slide is positioned between side guides 281 and is connected to the piston rod of an extensible fluid motor 285, the cylinder of which is stationarily mounted on the support members 275.

Upon operation of motor 285, a slide 280 is pushed forwardly to engage the pallet P resting at the bottom of device K and eject this pallet from the lowering device onto the pallet supporting platform 175. As previously mentioned, the platform 175, when the feeder L is operated will normally contain a loaded ware carrying pallet which is pushed by the empty pallet from the platform onto conveyor G to prepare the press for the next operation of removing ware from the press.

OVERALL WARE PRODUCTION OPERATION

The prepared raw clay material in a moist plastic condition is placed in the pug mill A where it is kneaded by the helical screw 11 as it is being fed to the deairing extruder B. In the deairing extruder the clay is exposed to vacuum to remove entrained air, whereupon a solid continuous cylinder of clay is extruded therefrom.

The clay as it is extruded passes through the measuring and cut-off assembly C and onto the bed 20 of slug loader D. The assembly C severs the continuous extrusion into discrete lengths of proper quantity or amount to form the toilet tank cover. The loader D moves the slugs S one at a time to charge the lower die DL of the ware press.

The shuttle 90 on the ware press E is moved to position the lower die DL as shown in FIGURE 4 and loader D loads the die dropping a slug S through chute 46.

Thereupon motor 106 is operated to shift the shuttle 90 to the position shown in FIGURE 2 whereat the lower die DL is positioned directly beneath the upper die DU. Once shifted the dog 111 is raised by motor 112 to engage locking stop 110. This positively locks the shuttle in position which is important when the dies are closed and the extreme pressure applied to press the ware.

In this relation the motors 122 are supplied with hydraulic fluid to drive the press platen 125 down whereupon the clay slug S is formed into the shape of the die cavity which in the instant example corresponds to the configuration of a tank cover. After completing the pressing operation, the press platen 125 is raised by motors 122. Before raising the platen to separate the upper and lower dies, release pressure is applied through the porous lower die DL so that the pressed ware will be released from the lower die and will move upwardly, retained on the underside of the upper die DU. It will be appreciated that any flash clay surrounding the pressed ware will also be released from the lower die and be retained on the upper die.

The locking dog 111 is retracted by motor 112 to release the shuttle. The shuttle 90 is again shifted by operation of motor 106 to return it to the position as shown in FIGURE 4.

With the shuttle positioned as shown in FIGURE 4 the lifting pins 180 are elevated to raise the platform 175 along with the trimming blade 205 and scrap tray 185. The parts are thus raised to assume a position as shown in FIGURE 15 resulting in the blade 205 severing the scrap from the desired pressed ware W whereupon release pressure is applied to the porous upper die DU and the ware W settles onto the empty pallet P while the flash is released as scrap onto scrap tray 185.

The lifting pins 180 are then lowered returning the platform 175 to rest on the pallet 90. The scrap and ware W are now separated in the manner as shown in FIGURE 13.

While the ware W and scrap are being separated and released from the upper die DU, the dewatering hood 140 for the lower die is shifted by operation of motor 147 to overlie the lower die DL which die is then in the loading position. With the hood 140 so positioned, air is applied through the air jets in the hood 140 to blow off and carry away excess moisture from the surface of the lower die. If more moisture need be removed to maintain proper moisture condition of the die, a purging pressure may be applied after the ware release pressure is terminated. Upon completion of this operation the motor 147 is again operated to retract the dewatering hood 140. The lower die DL is now in condition to receive another clay slug and accordingly motor 44 on loader D operates to drop another slug through chute 46 thereby loading the die DL.

The shuttle 90 is again shifted by motor 106 and locking dog 111 operated by motor 112 to lock the shuttle in position. Before undertaking the next pressing operation, the dewatering hood 154 for the upper die is extended by operation of motor 65 to dispose the hood beneath upper die DU. Air jets are then jetted from nozzle ring 155 against the under surface of the upper die DU to remove excess moisture from the die surface. As mentioned in connection with dewatering the lower die, a purging pressure may be applied to the upper die after the release pressure is terminated if the die condition calls for removal of a greater amount of moisture. Dewatering hood 154 is thereafter retracted by motor 165 and the pressing operation commenced by moving press platen 125 down to form the ware from the most recently placed slug of clay in the lower die DL.

During this second pressing operation, the scrap previously removed and now resting on tray 185 is cleared from the tray by operating motor 200 which pivots the tray across the series of rollers 220 to position it beneath air jet ring 225. Air under pressure is applied to ring 225 and the air jets lift the scrap ring and blow it inwardly and down through the center opening 188 of tray 185 whereupon it falls onto scrap return conveyor F. This conveyor carries the scrap back to the pug mill A dumping it in with the clay being kneaded by screw 11 in the open trough 10.

At the same time the pallet feeder L operates by motor 285 moving slide 280 to push an empty pallet P onto platform 175 while the ware loaded pallet is pushed off of the platform onto conveyor G. With an empty pallet on platform 175 and the scrap tray cleared and returned by operation of motor 200, the mechanism is ready to perform the next operation of removing and separating the ware and scrap which has been produced by a second pressing operation. It will thus be appreciated how this sequence of operations may be carried out in accordance with timed operation of the various components to produce in a continuous manner pressed ware free of flash scrap material.

The loaded pallet is carried on conveyor G and the ware exposed to a drying operation at H whereafter the pallet and ware are separated, the ware then being given a final trimming, glazed, and fired. The empty pallet is placed on the pallet elevator I which raises it and deposits it on the elevated roller conveyor J. As the pallet is returned on conveyor J, it is brushed clean by brushes 255 and passes onto the lowering device K under control of solenoid operated brake 260.

The pallets are held and released at proper intervals from the end of conveyor J by operation of brake 260. Once released the pallet is lowered in device K and positioned in pallet feeder L in readiness to be reused in timed sequence with subsequent operation of the ware press.

Many variations and modifications of the present invention will occur to those skilled in the art from a study of the invention modification specifically disclosed herein. All such variations and modifications which come within the spirit and scope of the appended claims are intended to be included herein as fully and completely as if they had been specifically illustrated, described and claimed. Thus the modification specifically disclosed is exemplary only and not intended to be limiting on the scope of the invention.

We claim:

1. Apparatus for producing pressed ware from plastic material comprising a press having a vertically reciprocable press platen carrying an upper downwardly facing ware forming die and a press bed having a stationary bolster and disposed beneath said platen, a shuttle mounted on said press bed to be movable in a generally horizontal path beneath said platen, a lower upwardly facing ware forming die mounted on said shuttle adjacent one end of said shuttle, means for shifting said shuttle between a first position whereat said lower die is positioned above said bolster and beneath said upper die and a second position whereat the opposite end of said shuttle is positioned beneath said upper die, said lower die being disposed for loading a slug of plastic material onto such die when such shuttle is in said second position, power means for moving said dies together when said shuttle is in said first position to form the pressed ware from a slug of plastic material disposed between said dies, fluid pressure release means connected to apply release pressure through the surface of said lower die to free the ware therefrom so that it will be retained on said upper die as the dies separate, and fluid pressure release means connected to apply release pressure through the surface of said upper die to free the ware therefrom when said shuttle is in said second position to deposit the ware on said opposite end of said shuttle whereupon it may be removed from beneath said platen by shifting said shuttle to said first position and at the same time move the slug loaded lower die beneath said upper die for a subsequent ware pressing operation.

2. Apparatus for producing pressed ware from plastic material comprising a press having a vertically reciprocable press platen carrying an upper downwardly facing ware forming die and a press bed having a stationary bolster disposed beneath said platen, a shuttle mounted on said press bed to be movable in a generally horizontal path beneath said platen, a lower upwardly facing ware forming die mounted on said shuttle adjacent one end of said shuttle and the opposite end of said shuttle providing a ware removal area, a pallet supporting platform mounted on said ware removal area of said shuttle to be elevatable relative to said shuttle, means mounted on said press bed for elevating said platform, means for shifting said shuttle between positions whereat said lower die and said platform are alternately positioned between said bolster and said press platen, means for feeding a slug of plastic material onto said upwardly facing lower die, power means for moving said dies together when said lower die is positioned beneath said platen to form the slug into the pressed ware, fluid pressure release means connected to apply release pressure through the surface of said lower die to free the ware therefrom so that it will be retained on said upper die as the dies separate, and fluid pressure release means connected to apply release pressure through the surface of said upper die to free the ware therefrom when said platform is positioned in an elevated position beneath said press platen to deposit the ware on said platform whereupon it may be removed from beneath said platen by shifting of said shuttle.

3. Apparatus for producing pressed ware from plastic material as recited in claim 2 further comprising a conveyor for removing a ware carrying pallet from the press, and a pallet feeder for feeding an empty pallet onto said platform when said platform is lowered and said shuttle disposed with said lower die positioned beneath said upper die to thereby push the ware carrying pallet from said platform onto said conveyor.

4. Apparatus for producing pressed ware from plastic material as recited in claim 2 further comprising a pallet feeder mounted to feed a pallet onto said platform when said shuttle is disposed with said lower die positioned beneath said upper die, conveyor means for removing the ware carrying pallet from said press as it is pushed from said platform by the feeding of an empty pallet to said platform by said pallet feeder, a pallet elevator disposed at a ware and pallet separating station adjacent the end of said conveyor means for elevating the empty pallet after the ware is removed therefrom, a pallet lowering device mounted to return the empty pallet to said pallet feeder, and an elevated conveyor for receiving the empty pallet from said pallet elevator and transporting it to said lowering device.

5. Apparatus as recited in claim 4 wherein brake means are associated with said elevated conveyor and operable to retain the empty pallet on said conveyor pending demand therefore in the operating cycle of said ware press.

6. Apparatus as recited in claim 4 wherein said pallet elevator includes endless chains carrying pallet receiving shelves, said chains being movable in a vertical path, and said elevated conveyor has the end thereof cooperating with said elevator so that the empty pallet is deposited on said elevated conveyor as said shelves commence their downward travel as guided by said endless chains.

7. Apparatus for producing pressed ware from plastic material comprising a press having a vertically reciprocable press platen carrying an upper downwardly facing ware forming die and a press bed disposed beneath said platen, means mounting a first dewatering hood relative to said upper die to be movable beneath said upper die when said platen is raised, a shuttle mounted on said press bed to be movable in a generally horizontal path beneath said platen, a lower upwardly facing ware forming die mounted on said shuttle adjacent one end of said shuttle, means mounting a second dewatering hood relative to said lower die to be movable above said lower die, said dewatering hoods each defining a chamber with an open face area to overlie the die with which it is to cooperate and air jet forming means, said chamber to direct jets of air outwardly of said open face area and against the surface of the die with which it cooperates for removing water therefrom, said shuttle being movable between a first position whereat said lower die is positioned beneath said upper die and a second position whereat the opposite end of said shuttle is positioned beneath said upper die, power means for moving said dies together to form the pressed ware, an elevatable pallet supporting platform mounted on said opposite end of said shuttle adapted to carry a ware receiving pallet and raise the pallet to immediately beneath said upper die to have the pressed ware deposited thereon, and means for releasing the pressed ware from said lower die as the dies separate and for subsequently releasing the pressed ware from said upper die when said shuttle is in said second position to deposit the ware on a pallet on said platform.

8. Apparatus for producing pressed ware from plastic material comprising a press having a vertically reciprocable press platen carrying an upper downwardly facing ware forming die and a press bed disposed beneath said platen, a shuttle mounted on said press bed to be movable in a generally horizontal path beneath said platen, a lower upwardly facing ware forming die mounted on said shuttle adjacent one end of said shuttle, said shuttle being movable between a first position whereat said lower die is positioned beneath said upper die and a second position whereat the opposite end of said shuttle is positioned beneath said upper die, power means for moving said dies together when said shuttle is in said first position to form the pressed ware from plastic material disposed between said dies, an elevatable pallet supporting platform mounted on said opposite end of said shuttle adapted to carry a ware receiving pallet and raise the pallet to immediately beneath said upper die to have the pressed ware deposited thereon, a scrap trimming member mounted on said shuttle above said platform and movable upwardly with said platform to engage the upper die and thereby separate the scrap flash material encircling the pressed ware from the ware, a scrap tray mounted on said shuttle above said platform for collecting the separated scrap, and means for releasing the pressed ware from said lower die as the dies separate and for subsequently releasing the pressed ware from said upper die when said shuttle is in said second position to deposit the ware on a pallet on said platform.

9. Apparatus for producing pressed ware from plastic material comprising an extruder for feeding an extrusion of plastic material, a cut-off assembly mounted to sever the extrusion into discrete lengths in the form of slugs each having a quantity of material to produce a pressed ware piece, a slug loader disposed to receive said slugs from said cut-off assembly and move them in succession to load the dies of a ware press, a press having a vertically reciprocable press platen carrying an upper downwardly facing ware forming die and a press bed disposed beneath said platen, means mounting a first dewatering hood relative to said upper die to be movable beneath said upper die when said platen is raised, a shuttle mounted on said press bed to be movable in a generally horizontal path beneath said platen, a lower upwardly facing ware forming die mounted on said shuttle adjacent one end of said shuttle, means mounting a second dewatering hood relative to said lower die to be movable above said lower die, said dewatering hoods each defining a chamber with an open face area to overlie the die with which it is to cooperate and air jet forming means, said chamber to direct jets of air outwardly of said open face area and against the surface of the die with which it cooperates for removing water therefrom, said shuttle being movable between a first position whereat said lower die is positioned beneath said upper die and a second position whereat the opposite end of said shuttle is positioned beneath said upper die, power means for moving said dies together to form the pressed ware, and means for releasing the pressed ware from said lower die as the dies separate and for subsequently releasing the pressed ware from said upper die when said shuttle is in said second position to deposit the ware on the opposite end of said shuttle.

10. Apparatus as recited in claim 9 wherein said mounting means for said first dewatering hood includes track means carried on the underside of said platen to guide movement of said first dewatering hood in beneath said upper die, and said mounting means for said second dewatering hood includes track means extending above said lower die when said shuttle is in said second position to guide movement of said second dewatering hood to overlie said lower die.

11. Apparatus as recited in claim 9 wherein extensible fluid motor means are connected to effect operation of said dewatering hoods in accordance with the operating cycle of said ware press.

12. Apparatus for producing pressed ware from plastic material comprising a press having a vertically reciprocable press platen carrying an upper downwardly facing ware forming die and a press bed disposed beneath said platen, a shuttle mounted on said press bed to be movable in a generally horizontal path beneath said platen, means for shifting said shuttle between a first position whereat said lower die is positioned beneath said upper die and a second position whereat the opposite end of said shuttle is positioned beneath said upper die, a lower upwardly facing ware forming die mounted on said shuttle adjacent one end of said shuttle, means for loading a slug of plastic material onto said lower die when said shuttle is in said second position, power means for moving said dies together when said shuttle is in said first position to form the pressed ware, a scrap trimming member mounted on said opposite end of said shuttle to be elevatable into engagement with said upper die when said shuttle is in said second position to separate the scrap flash material encircling the pressed ware from the ware, a scrap tray mounted on said opposite end of said shuttle for collecting the separated scrap, means for releasing the pressed ware from said lower die as the dies separate and for subsequently releasing the pressed ware from said upper die when said shuttle is in said second position to deposit the ware on the shuttle, and means for removing the deposited ware from said opposite end of said shuttle with said shuttle in said first position preparatory to reshift of said shuttle to remove a succeeding ware piece from said upper die.

13. Apparatus for producing pressed ware from plastic material comprising a press having a vertically reciprocable press platen carrying an upper downwardly facing ware forming die and a press bed having a stationary bolster disposed beneath said platen, a shuttle mounted on said press bed to be movable in a generally horizontal path beneath said platen, a lower upwardly facing ware forming die mounted on said shuttle adjacent one end of said shuttle and the opposite end of said shuttle providing a ware removal area, a pallet supporting platform mounted on said ware removal area of said shuttle to be elevatable relative to said shuttle, means for elevating said platform, said shuttle being shiftable between positions whereat said lower die and said platform are alternately positioned between said bolster and said press platen, means for feeding a slug of plastic material onto said upwardly facing lower die, power means for moving said dies together when said lower die is positioned beneath said platen to form the slug into the pressed ware, and means for releasing the pressed ware from said lower die as the dies separate and for subsequently releasing the pressed ware from said upper die when said shuttle is in said second position to deposit the ware on a pallet on the elevated pallet supporting platform whereupon it may be removed from beneath said platen by shifting said shuttle to said first position and lowering said platform.

14. Apparatus for producing pressed ware from plastic material comprising a press having a vertically reciprocable press platen carrying an upper downwardly facing ware forming die and a press bed disposed beneath said platen, means mounting a first dewatering hood relative to said upper die to be movable beneath said upper die when said platen is raised, a shuttle mounted on said press bed to be movable in a generally horizontal path beneath said platen, a lower upwardly facing ware forming die mounted on said shuttle adjacent one end of said shuttle, means mounting a second dewatering hood relative to said lower die to be movable above said lower die, said dewatering hoods each defining a chamber with an open face area to overlie the die with which it is to cooperate and air jet forming means, said chamber to direct pets of air outwardly of said open face area and against the surface of the die with which it cooperates for removing water therefrom, said shuttle being movable between a first position whereat said lower die is positioned beneath said upper die and a second position whereat the opposite end of said shuttle is positioned beneath said upper die, power means for moving said dies together to form the pressed ware, an elevatable pallet supporting platform mounted on said opposite end of said shuttle adapted to carry a ware receiving pallet and raise the pallet to immediately beneath said upper die to have the pressed ware deposited thereon, fluid pressure release means connected to apply release pressure through the surface of said lower die to free the ware therefrom so that it will be retained on said upper die as the dies separate, and fluid pressure release means connected to apply release pressure through the surface of said upper die to free the ware therefrom when said shuttle is in said second position to deposit the ware on said opposite end of said shuttle whereupon it may be removed from beneath said platen by shifting said shuttle to said first position.

15. Apparatus for producing pressed ware from plastic material comprising a press having a vertically reciprocable press platen carrying an upper downwardly facing ware forming die and a press bed disposed beneath said platen, a shuttle mounted on said press bed to be movable in a generally horizontal path beneath said platen, a lower upwardly facing ware forming die mounted on said shuttle adjacent one end of said shuttle, said shuttle being movable between a first position whereat said lower die is positioned beneath said upper die and a second position whereat the opposite end of said shuttle is positioned beneath said upper die, power means for moving said dies together when said shuttle is in said first position to form the pressed ware from plastic material disposed between said dies, an elevatable pallet supporting platform mounted on said opposite end of said shuttle adapted to carry a ware receiving pallet and raise the pallet to immediately beneath said upper die to have the pressed ware deposited thereon, a scrap trimming member mounted on said shuttle above said platform and movable upwardly with said platform to engage the upper die and thereby separate the scrap flash material encircling the pressed ware from the ware, a scrap tray mounted on said shuttle above said platform for collecting the separated scrap, fluid pressure release means connected to apply release pressure through the surface of said lower die to free the ware therefrom so that it will be retained on said upper die as the dies separate, and fluid pressure release means connected to apply release pressure through the surface of said upper die to free the ware therefrom when said shuttle is in said second position to deposit the ware on said opposite end of said shuttle whereupon it may be removed from beneath said platen by shifting said shuttle to said first position.

16. Apparatus for producing pressed ware from plastic material comprising a press having a vertically reciprocable press platen carrying an upper downwardly facing ware forming die and a press bed disposed beneath said platen, a shuttle mounted on said press bed to be movable in a generally horizontal path beneath said platen, means for shifting said shuttle between a first position whereat said lower die is positioned beneath said upper die and a second position whereat the opposite end of said shuttle is positioned beneath said upper die, a lower upwardly facing ware forming die mounted on said shuttle adjacent one end of said shuttle, means for loading a slug of plastic material onto said lower die when said shuttle is in said second position, power means for moving said dies together when said shuttle is in said first position to form the pressed ware, a scrap triming member mounted on said oposite end of said shuttle to be elevatable into engagement with said upper die when said shuttle is in said second position to separate the scrap flash material encircling the pressed ware from the ware, a scrap tray mounted on said opposite end of said shuttle for collecting the separated scrap, fluid pressure release means connected to apply release pressure through the surface of said lower die to free the ware therefrom so that it will be retained on said upper die as the dies separate, fluid pressure release means connected to apply release pressure through the surface of said upper die to free the ware therefrom when said shuttle is in said second position to deposit the ware on said opposite end of said shuttle whereupon it may be removed from beneath said platen by shifting said shuttle to said first position, and means for removing the deposited ware from said opposite end of said shuttle with said shuttle in said first position preparatory to reshift of said shuttle to remove a succeeding ware piece from said upper die.

References Cited by the Examiner

UNITED STATES PATENTS

| | | | |
|---|---|---|---|
| 356,585 | 1/87 | Hill | 25—104 |
| 631,630 | 8/99 | Garrett et al. | 25—104 XR |
| 707,921 | 8/02 | Hall. | |
| 857,364 | 6/07 | Roseback. | |
| 903,840 | 11/08 | Carter | 18—16 |
| 930,053 | 8/09 | Diefendorf. | |
| 1,455,240 | 5/23 | Cobb | 18—2 |
| 1,527,674 | 2/25 | Davis. | |
| 1,542,601 | 6/25 | Bornhauser | 18—47.5 |
| 1,641,922 | 9/27 | Davis | 18—16 |
| 1,706,874 | 3/29 | De Journo. | |
| 1,958,184 | 5/34 | Cross | 25—122 |
| 1,958,422 | 5/34 | Dinzl | 18—4 |
| 2,027,165 | 1/36 | Grubman | 18—4 |
| 2,091,767 | 8/37 | Miller | 25—156 |
| 2,109,028 | 2/38 | Miller | 25—22 XR |
| 2,257,732 | 10/41 | Clark | 18—16 |
| 2,280,276 | 4/42 | Antibus et al. | 25—104 |
| 2,293,914 | 8/42 | Nanfeldt | 18—47.5 |
| 2,450,437 | 10/48 | Miller | 25—22 |
| 2,582,891 | 1/52 | Strauss | 18—2 XR |
| 2,632,227 | 3/53 | Steele et al. | 18—2 XR |
| 2,632,936 | 3/53 | Skipper | 18—4 XR |
| 2,692,418 | 10/54 | Besser. | |
| 2,712,168 | 7/55 | Kenline | 25—45 |
| 2,763,049 | 9/56 | Peebles | 25—156 |
| 2,825,954 | 3/58 | Ripley | 25—2 |
| 2,835,016 | 5/58 | Dixon. | |
| 2,839,786 | 6/58 | Alesi | 18—2 XR |
| 2,873,475 | 2/59 | Linhorst | 18—17 XR |
| 2,877,531 | 3/59 | Heine | 25—45 XR |
| 2,888,731 | 6/59 | McElroy | 25—45 |
| 2,898,658 | 8/59 | Harry | 18—47 XR |
| 2,954,584 | 10/60 | Groves | 18—2 XR |
| 2,959,818 | 11/60 | Diehl et al. | 18—2 XR |
| 3,009,228 | 11/61 | Hellstrom | 25—2 |

WILLIAM J. STEPHENSON, *Primary Examiner.*